US010448128B2

(12) United States Patent
Sato et al.

(10) Patent No.: US 10,448,128 B2
(45) Date of Patent: Oct. 15, 2019

(54) OPTICAL SWITCH DEVICE

(71) Applicant: National University Corporation Nagoya University, Aichi (JP)

(72) Inventors: Ken-ichi Sato, Nagoya (JP); Hiroshi Hasegawa, Nagoya (JP); Yojiro Mori, Nagoya (JP); Koh Ueda, Nagoya (JP)

(73) Assignee: National University Corporation Nagoya University, Aichi (JP)

(*) Notice: Subject to any disclaimer, the term of this patent is extended or adjusted under 35 U.S.C. 154(b) by 0 days.

(21) Appl. No.: 16/071,742

(22) PCT Filed: Jan. 26, 2017

(86) PCT No.: PCT/JP2017/002832
§ 371 (c)(1),
(2) Date: Jul. 20, 2018

(87) PCT Pub. No.: WO2017/131125
PCT Pub. Date: Aug. 3, 2017

(65) Prior Publication Data
US 2019/0028785 A1 Jan. 24, 2019

(30) Foreign Application Priority Data

Jan. 29, 2016 (JP) ................................. 2016-015710

(51) Int. Cl.
*H04J 14/00* (2006.01)
*H04Q 11/00* (2006.01)
*H04J 14/02* (2006.01)

(52) U.S. Cl.
CPC ...... *H04Q 11/0005* (2013.01); *H04J 14/0212* (2013.01); *H04Q 2011/005* (2013.01);
(Continued)

(58) Field of Classification Search
CPC ...... H04J 14/0212; H04J 14/021; H04J 14/02; H04J 14/0209; H04J 14/0208;
(Continued)

(56) References Cited

U.S. PATENT DOCUMENTS 6,058,227 A * 5/2000 Wong .................. H04J 14/0298
385/16
6,426,832 B1 7/2002 Kinoshita
(Continued)

FOREIGN PATENT DOCUMENTS

JP H11-55268 A 2/1999
JP 2000-295177 A 10/2000

OTHER PUBLICATIONS

Notification of Transmittal of Translation of the International Preliminary Report on Patentability and Translation of Written Opinion of the International Searching Authority; PCT/JP2017/002832; dated Aug. 9, 2018.
(Continued)

*Primary Examiner* — Hibret A Woldekidan
(74) *Attorney, Agent, or Firm* — Studebaker & Brackett PC

(57) ABSTRACT

A wavelength routing SW is a large-scale optical switch device of a conventional technique, and it requires as many wavelength-tunable light sources as the number of input ports. For the wavelength-tunable light sources to achieve a stable oscillating operation across a wide wavelength range, a complicated control mechanism is necessary. This has been an obstacle in providing a large-scale optical switch device in terms of cost and circuit scale. A wavelength routing SW in the present disclosure includes N wavelength group generators, a splitting-selection unit, and MN tunable filters. Each wavelength group generator includes M fixed-wavelength light sources. Inexpensive general-purpose devices that require no control mechanism for wavelength
(Continued)

tuning can be used as the fixed-wavelength light source. The channel loss in the optical switch device can also be reduced by using light sources with a limited narrow range of tunable wavelengths and the wavelength-dependent output port selecting function of an AWG.

23 Claims, 29 Drawing Sheets

(52) U.S. Cl.
CPC ............ *H04Q 2011/0009* (2013.01); *H04Q 2011/0015* (2013.01); *H04Q 2011/0016* (2013.01); *H04Q 2011/0018* (2013.01); *H04Q 2011/0032* (2013.01); *H04Q 2011/0049* (2013.01)

(58) Field of Classification Search
CPC ........... H04J 14/0205; H04J 14/0279; H04J 14/0204; H04J 14/0217; H04J 14/0219; H04J 14/0284; H04J 14/0298; H04J 2203/0012; H04J 2203/0019; H04B 10/506; H01S 5/141; H04Q 11/0005; H04Q 2011/0009; H04Q 2011/0015; H04Q 2011/0016; H04Q 2011/0018; H04Q 2011/0032; H04Q 2011/0049; H04Q 2011/005; H04Q 11/0001
USPC ... 398/45, 48, 50, 68, 79, 82, 84, 85, 87, 51
See application file for complete search history.

(56) References Cited

U.S. PATENT DOCUMENTS

| | | | | |
|---|---|---|---|---|
| 6,542,268 B1 * | 4/2003 | Rotolo | ............... | H04J 14/0204 369/44.23 |
| 6,643,042 B1 | 11/2003 | Nishio et al. | | |
| 6,961,522 B1 * | 11/2005 | Castagnetti | ........ | H04B 10/2916 398/157 |
| 8,315,522 B2 * | 11/2012 | Urino | ................ | H04J 14/02 398/68 |
| 9,401,774 B1 * | 7/2016 | Mineo | ................ | H04Q 11/0005 |
| 9,788,089 B2 * | 10/2017 | Sato | ................ | H04J 14/0212 |
| 2009/0041457 A1 * | 2/2009 | Maki | ................ | H04J 14/0204 398/45 |
| 2009/0324243 A1 * | 12/2009 | Neilson | ............ | H04Q 11/0005 398/154 |
| 2010/0086301 A1 * | 4/2010 | Fujita | ................. | H04J 14/0204 398/48 |
| 2011/0164876 A1 * | 7/2011 | Fujita | ................. | H04J 14/0204 398/48 |
| 2012/0201536 A1 * | 8/2012 | Liu | ..................... | H04J 14/0204 398/50 |
| 2015/0333835 A1 * | 11/2015 | Matsukawa | ........... | H04B 10/60 398/48 |

OTHER PUBLICATIONS

International Search Report issued in PCT/JP2017/002832; dated Apr. 4, 2017.

Koh Ueda et al., "Novel Large-port-count Optical-switch Architecture for Optical Interconnection in Datacenters", the Institute of Electronics, Information and Communication Engineers, a document by the Technical Committee on Photonic Network, Department of Electrical Engineering and Computer Science of Nagoya University, NTT Device Innovation Center of NTT Corporation, Mar. 19, 2015, 3 pages, Japan; with English Abstract.

Koh Ueda et al., "Novel Large-port-count Optical-switch Architecture for Optical Interconnection in Datacenter", Department of Electrical Engineering and Computer Science of Nagoya University, NTT Photonics Laboratories of NTT Corporation, 2014, 3 pages, Japan.

Koh Ueda et al., "Large-Scale Optical Circuit Switch for Intra-Datacenter Networking Using Silicon-Photonic Multicast Switch and Tunable Filter", Ngoya University, National Institute of Advanced Industrial Science and Technology (AIST), NEC Corporation, 2016, 3 pages, Japan.

Mungun-Erdene Ganbold et al., "1,024×1,024 Optical Circuit Switch Using Wavelength-Tunable and Bandwidth-Variable Silicon Photonic Filter", Nagoya Universiy, National Institute of Advanced Industrial Science and Technology (AIST), 2 pages, Japan.

* cited by examiner

CONFIGURATION EXAMPLES OF EMBODIMENT 6 AND EMBODIMENT 9

| | NUMBER OF WAVELENGTH GROUP GENERATORS | 1 MAXIMUM NUMBER OF LIGHT SOURCES IN A SINGLE WAVELENGTH GROUP GENERATOR | NUMBER OF AWG OUTPUT PORTS | NUMBER OF SPLITTING-SELECTION UNITS | OPTICAL SPLITTER/WSS IN A SINGLE SPLITTING-SELECTION UNIT | | | OPTICAL SWITCH IN A SINGLE SPLITTING-SELECTION UNIT | | | NECESSARY NUMBER OF PORTS | OUTPUT PORT STATE |
|---|---|---|---|---|---|---|---|---|---|---|---|---|
| | | | | | NUMBER | CONFI-GURATION | | NUMBER | CONFI-GURATION | | | |
| MN/L = NATURAL NUMBER | N | M | L | L | N | 1×MN/L | | MN/L (NATURAL NUMBER) | N×1 | | M×N | NO REMAINING PORT |
| EXAMPLE 1 | 5 | 100 | 10 | 10 | 5 | 1×50 | | 50 | 5×1 | | 500 | NO REMAINING PORT |
| EXAMPLE 2 | 8 | 100 | 4 | 4 | 8 | 1×200 | | 200 | 8×1 | | 800 | NO REMAINING PORT |
| EXAMPLE 3 | 10 | 80 | 8 | 8 | 10 | 1×100 | | 100 | 10×1 | | 800 | NO REMAINING PORT |
| MN/L ≠ NATURAL NUMBER | N | M | L | L | N | 1×K | | K (NOTE: SMALLEST) | N×1 | | | (KL−MN) PORT(S) REMAINING |
| EXAMPLE 4 (K=84) | 5 | 100 | 6 | 6 | 5 | 1×84 | | 84 | 5×1 | | 500 | 4 PORTS REMAINING |
| EXAMPLE 5 (K=134) | 10 | 80 | 6 | 6 | 10 | 1×134 | | 134 | 10×1 | | 800 | 4 PORTS REMAINING |
| EXAMPLE 6 (K=94) | 8 | 82 | 7 | 7 | 8 | 1×94 | | 94 | 8×1 | | 656 | 2 PORTS REMAINING |

K IS THE SMALLEST NATURAL NUMBER SATISFYING MN/L ≤ K.

FIG.20

OPTICAL SWITCH DEVICE

TECHNICAL FIELD

The present disclosure relates to an optical switch device that switches optical signal channels. More specifically, the present disclosure relates to a large-scale optical circuit switching switch device suitable for a network in a data center.

BACKGROUND ART

Various types of information terminal devices have been spread to people and things on a global scale. Communication networks, wireless and wired, have been expanding, and the volume of data transferred therethrough has become extremely large. Given such circumstances, the power consumption of information communication systems has become extremely large as well, and intensive studies have been conducted for lowering the power consumption in various layers in information communication networks such as a core network, a metro/LAN, and an access network. One key technique as one of approaches to lower the power consumption of an information communication system is an optical routing technique, in which information processing is performed at an optical signal layer instead of an electrical signal layer. It is considered that routing with optical passive devices by using the optical routing technique can greatly reduce processing at the electrical layers in communication nodes and greatly lower the power consumption of the whole communication network.

One of the important infrastructural elements in an information communication network is a data center. A data center is a general term for buildings designed for the purpose of installing and operating equipment such as Internet servers, data communications, and landline, mobile, and IP telephones. A large number of communication lines are routed into a data center, and a very large number of server computers and the like are gathered inside the building. Reducing the power consumption inside the data center has been a very important issue. In recent years in particular, IP traffic within data centers has been expected to increase greatly due to not only the increase in the number of users but also the increase in the amount of processing over a plurality of servers by the separation of functionality among application servers, data storages, and database servers, the use of distributed processing and parallel processing, and so on. The amount of traffic transferred within data centers has been estimated to be about four times as large as the entire traffic on the Internet. Also, a large proportion of the traffic at a data center is traffic that remains within the data center, and its volume has been said to reach as large as 4.8 zettabyte ($4.8 \times 10^{21}$) by the year 2015. Now the situation is that the power consumption of a large-scale data center is over 100 MW (100,000 kW). Lowering the power consumption originating from traffic within a data center is a matter of urgency.

In a data center, there are: mice flows, which are small in volume and occur frequently for e-mailing, web searching, and the like; and elephant flows, which are large in volume and occur infrequently for moving virtual machines, data storage, and the like. Thus, for lower power consumption, a hybrid network has been proposed in which mice flows are processed by electrical switches while elephant flows, which account for a large proportion of the traffic, are processed by optical switches.

FIG. 1 is a diagram illustrating an overview of traffic processing in a data center. In a data center 10, a configuration called top of rack (TOR) is employed. A very large number of server computers, storages, and the like are grouped on a rack-by-rack basis, and a plurality of racks 1-1, 1-2, . . . , and 1-$n$ are disposed. With the TOR configuration, a switch (SW) is installed in each of top parts 2-1, 2-2, . . . , and 2-$n$ of the racks, through which the racks are connected to each other, and servers are housed in each rack. This enables equipment management with a high degree of freedom in which one rack is managed as the smallest constituent unit. Besides the server computers and the storages, the data center 10 includes core-layer apparatuses not illustrated, and the core layer and an external network 8 are connected by a large-capacity communication line 7.

Traffic within the data center can be processed such that an electrical SW 3 is used to switch channels 5 between racks for mice flows of traffic between the racks whereas an optical SW 4 is used to switch channels 6 between racks for elephant flows for lower power consumption. Due to the rapid increase in communication traffic in recent years, the number n of racks at a data center is now over 1000, and there is a demand for an optical switch device capable of freely setting and changing the channels between 1000 racks. Specifically, there is a great need for a circuit switching optical switch device of a large scale over 1000×1000.

FIG. 2A to FIG. 2C are diagrams explaining the function and configuration of an optical switch. FIG. 2A illustrates a conceptual configuration of the optical switch. An optical switch 20 operates such that an optical signal input into one of N input ports illustrated on the left side is output to one of N output ports illustrated on the right side. The optical switch 20 can freely form a channel from the TOR part of one rack among the plurality (n) of racks in FIG. 1 to the TOR part of one of the other racks and quickly switches the channel to a different new channel as needed. As illustrated in FIG. 2B, the simplest configuration of an optical switch is a space matrix SW including constituent SW elements 22 arranged in a two-dimensional matrix. A space matrix SW can be configured three-dimensionally by using MEMS (Micro Electro Mechanical Systems). However, space matrix SWs, which include constituent SW elements, are known to be such that as the number N of ports increases, the required number of constituent SW elements 22 increases in proportion to $N^2$, as in a conceptual diagram of the correlation between the number N of ports and the number of constituent SW elements illustrated in FIG. 2C. For this reason, in a situation where the number of server racks connected to each other in a data center is more than 1000 and the numbers N of input ports and output ports of the optical switch device are each more than 1000, the number of constituent SW elements will be very large, and therefore a space matrix SW will not be realistic in view of the circuit scale and the cost.

By employing a multi-stage configuration in which a plurality of matrix SWs are cascaded, the number of constituent SW elements in the whole SW can be reduced to some extent. Nonetheless, its effect is limited. As the number N of ports increases, the required number of constituent SW elements 22 increases in proportion to $N^{1.5}$, as illustrated in FIG. 2C. In the case where the number N of ports of the optical switch device is over 1000, an increase in the number of constituent SW elements is still a major problem even if the multi-stage configuration is employed. Further, configurational restrictions will also be added in order to satisfy requirements for a complete switch. A wavelength routing SW has been known as a space optical switch configuration with which the increase in the number of constituent SW elements with an increase in the number N of ports can be suppressed to be substantially linear (the first power of N), as illustrated by the dotted line in FIG. 2C.

FIG. 3 is a diagram conceptually illustrating the configuration of a wavelength routing SW. An exemplary wavelength routing SW 30 is a space SW that switches 100 inputs to 100 outputs and includes 100 wavelength-tunable light sources (LDs: laser diodes) 31-1 to 31-100 on the input port side and a demultiplexer 35 having 100 output ports 36-1 to 36-100 on the output port side. Each of the 100 wavelength-tunable LDs can be set to one of different wavelengths $\lambda_1$ to $\lambda_{100}$, and modulate light beams to be output from the LDs according to information signals 32-1 to 32-100, respectively. The modulated light beams with the different wavelengths from the wavelength-tunable LDs 31-1 to 31-100 are multiplexed by a coupler 33 and amplified by an optical amplifier 34 as needed. The multiplexed modulated light beam from the optical amplifier 34 is demultiplexed by the demultiplexer 35 for the 100 output ports 36-1 to 36-100, which are assigned with the wavelengths $\lambda_1$ to $\lambda_{100}$. As the demultiplexer 35, an arrayed waveguide grating (AWG) can be used, for example, and the demultiplexer 35 can demultiplex a wavelength-multiplexed light beam with at most 100 different wavelengths $\lambda_1$ to $\lambda_{100}$ by wavelength.

A wavelength routing operation can be described as below. For example, the oscillation wavelength of the wavelength-tunable LD 31-1, corresponding to the first input port, is set to $\lambda_{100}$. Here, the output light beam with the wavelength $\lambda_{100}$ is modulated by the information signal 32-1, which has been input into the first input port. The modulated optical signal with the wavelength $\lambda_{100}$ is output by the demultiplexer 35 to the output port 36-100, which is the 100-th output port. In other words, the information signal input into the first input port is connected to the 100-th output port. Here, if the oscillation wavelength of the wavelength-tunable LD 31-1 is set to $\lambda_1$, its light beam will be output to the output port 36-1, which is the first output port of the demultiplexer 35. Similarly, if the oscillation wavelength of the wavelength-tunable LD 31-1 set to $\lambda_{50}$, its light beam will be output to the output port 36-50, which is the 50-th output port of the optical demultiplexer 35.

By freely setting the oscillation wavelengths of the 100 wavelength-tunable LDs in the above manner, it is possible to freely select the ports to which to output the modulated optical signals. Since it is possible to output 100 different information signals to any positions among the 100 output ports, a 100×100 wavelength routing SW is obtained. While a wavelength routing SW completely differs from a space matrix SW in the configuration of the constituent SW elements due to their difference in principle, the hardware scale of the circuit increases substantially in proportion to the number N of input ports/output ports. It has therefore been considered possible to obtain an optical switch device with smaller scale hardware and a smaller cost than a space matrix SW.

In optical communication, the C-band (approximately 4400 GHz in width) has been widely used for its small propagation loss and has been available for a wide range of related devices and components. It is possible to use about 100 communication channels (100 waves) by setting the bandwidth of a single communication channel to 50 GHz in this C-band and also using a band somewhat higher than the C-band. With the bandwidth of a single communication channel halved to 25 GHz, it will be possible to form 200 channels (200 waves) within the C-band, yet the bandwidth of an information signal will be halved as well. There will also be a problem in the accuracy of the wavelength control on related components. Hence, it is not easy to increase the number of ports of a wavelength routing SW to 100 or more. To address this, a configuration in which wavelength routing units are arranged in parallel has been proposed as a configuration for further increasing the scale of a wavelength routing SW.

FIG. 4 is a diagram illustrating the configuration of a wavelength routing SW in a conventional technique having wavelength routing units arranged in parallel. In a wavelength routing SW 40 in FIG. 4, unlike the simplest wavelength routing SW configuration in FIG. 3, K wavelength routing units 48-1 to 48-K are arranged in parallel at the subsequent stage. On the input port side, modulated light beams from KN wavelength-tunable LDs 41 divided into N groups are selected and combined by N delivery and coupling (DC) switches and supplied to the K wavelength routing units 48-1 to 48-K. By arranging the wavelength routing units 48-1 to 48-K in parallel, it is possible to provide many ports in the optical switch device without increasing the number of wavelengths set for the wavelength-tunable LDs 41 on the input port side. Note that each of the DC switches is also called a multicast switch, and various products with different numbers of input ports and output ports are available as general-purpose products with M×N ports.

FIG. 5 is a diagram illustrating a configuration example of the DC switches used in the wavelength routing SW in the conventional technique. A DC switch 50 represents an example of the minimum configuration. It is configured to select and combine three waves ($\lambda_1$, $\lambda_2$, $\lambda_3$) from three wavelength-tunable LDs and includes three 1×3 switches 51-1 to 51-3 and three 3×1 optical multiplexers 52-1 to 52-3. FIG. 5 illustrates a setting example where the three wavelengths $\lambda_1$, $\lambda_2$, and $\lambda_3$ into the three input ports of the DC switch 50 are all output to the first output port 53. With the DC switch 50, each of the three wavelengths can be output to any of the output ports. Note that if the DC switch in FIG. 5 is used in the opposite signal direction, the DC switch will operate to demultiplex a multiplexed light beam ($\lambda_1$, $\lambda_2$, $\lambda_3$) and select and output only a light beam with one of the wavelengths. The switch is called a delivery and coupling (DC) switch as its operation includes the above. A method of using DC switches in which the direction of optical signals is opposite to the direction illustrated in FIG. 5, as mentioned above, will be discussed in later-described embodiments of the present disclosure.

In FIG. 4, one of the wavelengths for the first group of wavelength-tunable LDs can be set to select and be connected to one of the K wavelength routing units 48-1 to 48-K by a DC switch 42-1, and a channel to any one of the KN output ports on the output side can be formed. The inventors have proposed a specific configuration example of a wavelength routing SW (NPL 1) based on the configurations illustrated in FIG. 3 and FIG. 4 in an attempt to obtain a larger-scale wavelength routing SW that can handle increase in traffic in a data center.

FIG. 6 is a diagram illustrating the configuration of a large-scale wavelength routing SW in a conventional technique proposed by the inventors. A wavelength routing SW 60 illustrated in FIG. 6 is a more specific representation of the whole configuration in FIG. 4 with the DC switch configuration in FIG. 5. It includes wavelength-tunable LDs divided into N groups and M wavelength routing units 63-1 to 63-M arranged in parallel. FIG. 6, though omitting specific description of the configuration and operation, illustrates an example of an 800×800 large-scale wavelength routing SW with good transfer signal characteristics obtained by using 8×8 DC switches, erbium-doped fiber amplifiers (EDFAs), non-cyclic AWGs.

CITATION LIST

Patent Literature

NPL 1: Koh UEDA, Yojiro MORI, Hiroshi HASEGAWA, Ken-ichi SATO, Toshio WATANABE, "Novel Large-port-count Optical-switch Architecture for Optical Interconnection in Datacenters", Mar. 19, 2015, the Institute of Electronics, Information and Communication Engineers, a document by the Technical Committee on Photonic Network

SUMMARY OF INVENTION

Technical Problems

However, the large-scale wavelength routing SW in the conventional technique still have the following problems and is not satisfactory in terms of the availability of devices used and the cost. In the wavelength routing SW with the configuration illustrated in FIG. 4 and FIG. 6, the oscillation wavelengths can be set to any wavelengths within the entire C-band, and as many wavelength-tunable LDs as the input ports are required. Generally, a wavelength-tunable LD that can stably oscillate across a wide wavelength range is very expensive, and the amplifier that is required for the oscillator is expensive too. Moreover, a wavelength-tunable LD that can operate in the L-band beyond the C-band to increase the number of ports is more difficult to fabricate and expensive. Since it is difficult to use typically commercially available general-purpose products as the wavelength-tunable LD itself and its related components, there is a problem with their availability. Also, a complicated related wavelength tuning-control mechanism for stabilization of oscillating light is required as well, which increases the size of the light source itself. A wavelength routing SW including 1000 or more of such wavelength-tunable LDs is problematic also in view of its size.

The present disclosure has been made in view of these problems, and an object thereof is to provide an optical switch device at low cost.

Solution to Problem

According to one aspect of the present disclosure, an optical switch device is disclosed which is characterized in that the optical switch device comprises: N multiplexers each of which multiplexes light beams with at most M (M is a natural number larger than or equal to 2) different wavelengths and outputs a multiplexed light beam; N optical splitters each of which splits the multiplexed light beam from a corresponding one of the N multiplexers into MN split light beams; MN N×1 optical switches each of which selects, from among the split light beams from the N optical splitters, a split light beam corresponding to one multiplexer among the N multiplexers; and MN tunable filters each of which selects a light beam with any one wavelength from among the light beams with the at most M different wavelengths multiplexed by the one multiplexer selected by a corresponding one of the MN N×1 optical switches.

Advantageous Effect of Invention

As described above, according to the present disclosure, it is possible to provide an optical switch device at a lower cost than the conventional technique.

BRIEF DESCRIPTION OF DRAWINGS

FIG. 20 is a table of comparison in configuration parameters between embodiment 6, in which the value of MN/L is a natural number, and embodiment 9, in which the value of MN/L is a non-natural number.

DESCRIPTION OF EMBODIMENTS

Figure 1:
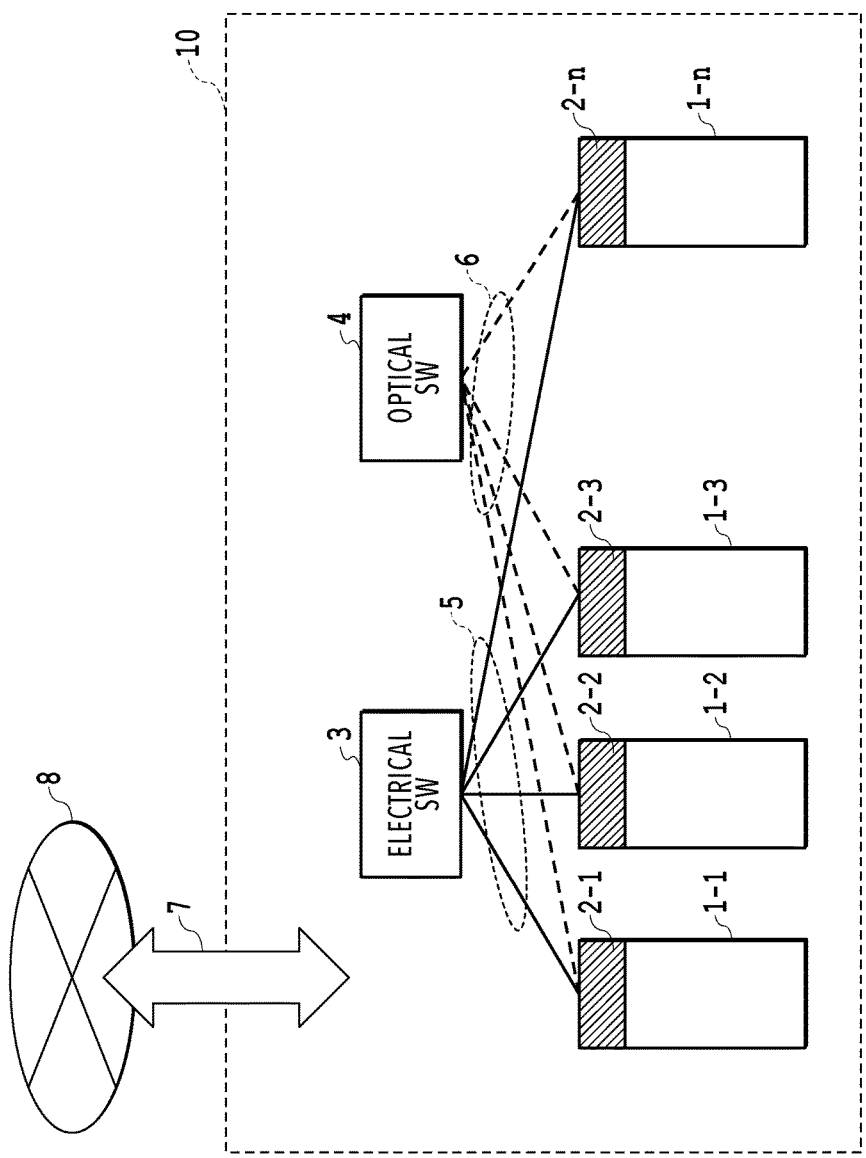
FIG. 1 is a diagram illustrating an overview of traffic processing in a data center.
Figure 2A:
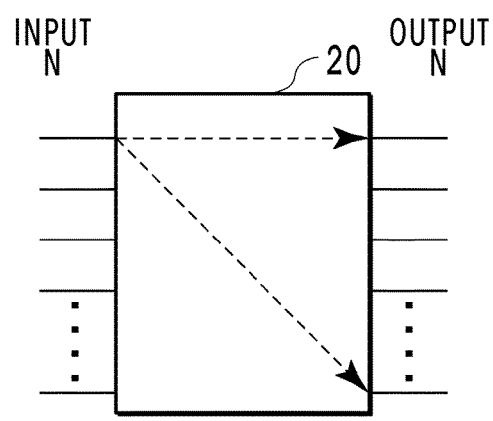
FIG. 2A is a diagram explaining the function and configuration of an optical switch.
Figure 2B:
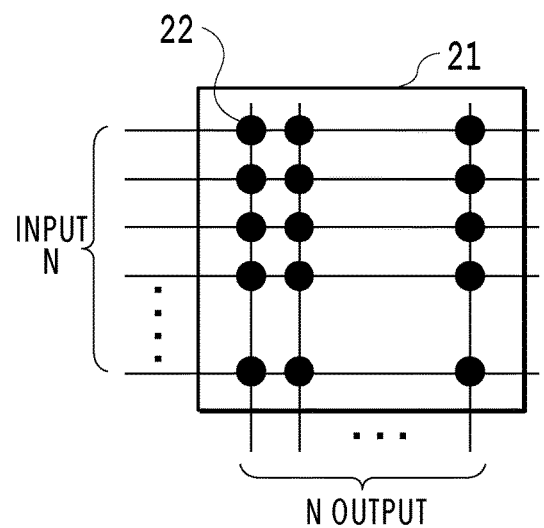
FIG. 2B is another diagram explaining the function and configuration of an optical switch.
Figure 2C:
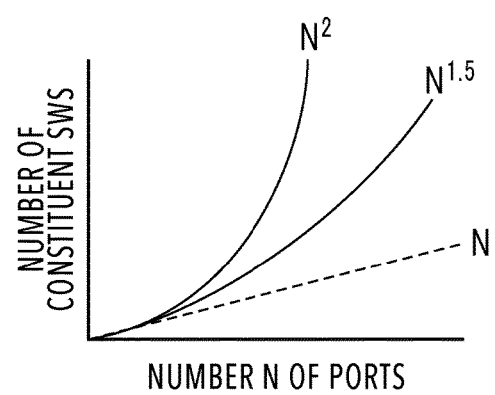
FIG. 2C is a conceptual diagram of the correlation between the number N of ports and the number of constituent SW elements.
Figure 3:
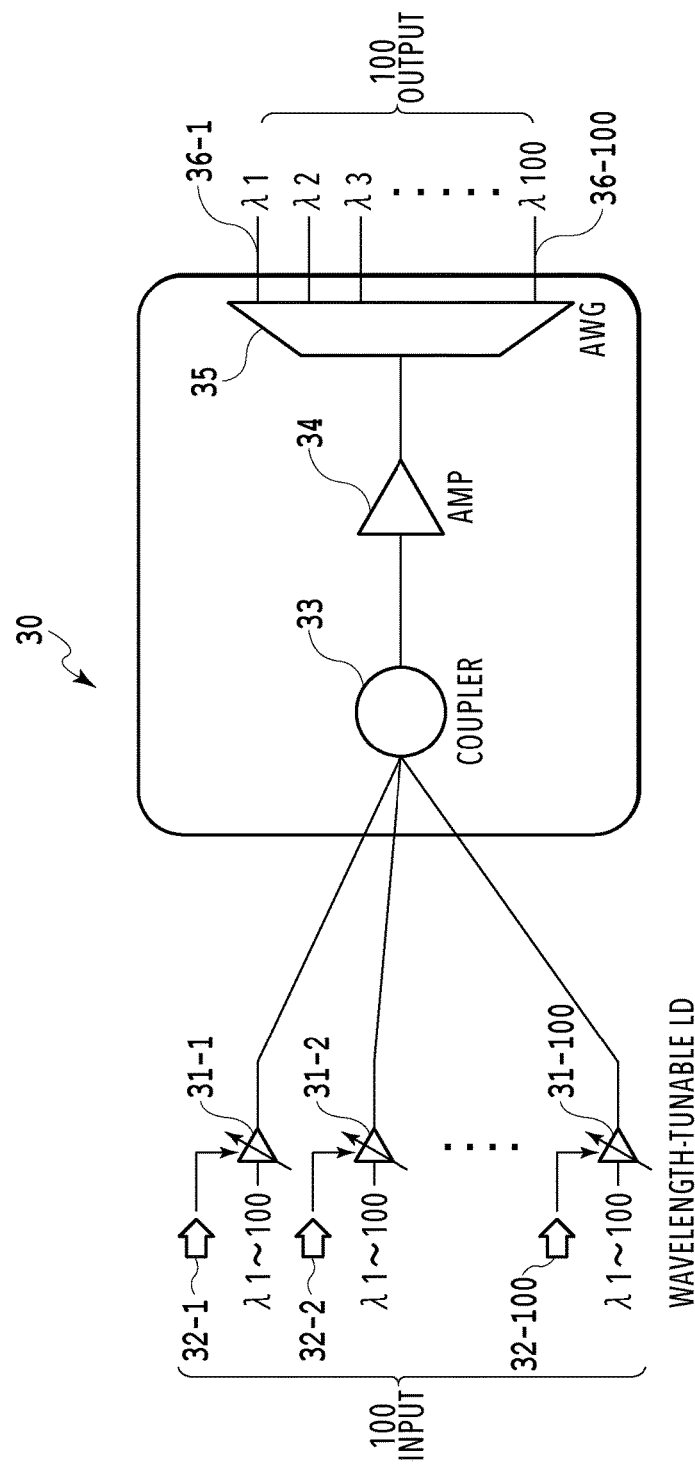
FIG. 3 is a diagram conceptually illustrating the configuration of a wavelength routing SW.

A wavelength routing switch (hereinafter SW) in the present disclosure can provide a large-scale optical switch device at lower cost by using inexpensive fixed-wavelength light sources and tunable filters. In the wavelength routing SW in the conventional technique, the wavelengths of the light sources on the input port side are tunable, wavelengths are selected which are to be set for (associated with) pieces of information to be routed, and the channels to the output ports as the final destinations are formed using the wavelength routing function of the demultiplexers at the subsequent stage. In contrast, the wavelength routing SW in the preset disclosure operates as follows. The wavelengths of the light sources on the input port side are fixed on a port-by-port basis, so that very inexpensive light sources are used. Modulated light beams with different wavelengths from the light sources are multiplexed to thereby generate multiplexed light beams and amplified as needed, and each single multiplexed light beam is split or demultiplexed for the output ports. At each target output port at the last stage, the wavelength selecting function of a tunable filter is used to select only the optical signal with the wavelength to be output, so that a channel is formed from the input port with the corresponding wavelength to the target output port.

In the following description, the term "wavelength routing switch" will also be referred to as "optical switch device", and these terms will be used interchangeably and mean the same. In the following disclosure in the present description, the terms "demultiplex" and "multiplex" will be used for wavelengths, and therefore wavelength demultiplexer, wavelength multiplexer, and wavelength multiplexer-demultiplexer will also be referred to simply as demultiplexer, multiplexer, multiplexer-demultiplexer, respectively, for simplicity.

According to one aspect of the present disclosure, an optical switch device is provided which comprises: N multiplexers each of which multiplexes light beams with at most M (M is a natural number larger than or equal to 2) different wavelengths and outputs a multiplexed light beam; N optical splitters each of which splits the multiplexed light beam from a corresponding one of the N multiplexers into K split light beams, where K is such a number that MN/K is a natural number; K N×(MN/K) delivery and coupling (DC) switches each of which selects, from among the split light beams from the N optical splitters, a split light beam corresponding to one multiplexer among the N multiplexers, the DC switches each including N 1×(MN/K) optical splitters to which outputs from the N optical splitters are connected, and (MN/K) N×1 optical switches which are connected to output ports of each of the N 1×(MN/K) optical splitters; and MN tunable filters each of which selects a light beam with any one wavelength from among the light beams with the at most M different wavelengths multiplexed by the one multiplexer selected by a corresponding one of the (MN/K) N×1 optical switches.

According to another aspect of the present disclosure, an optical switch device is provided which comprises: N multiplexers each of which multiplexes light beams with at most M (M is a natural number larger than or equal to 2) different wavelengths and outputs a multiplexed light beam; N optical splitters each of which splits the multiplexed light beam from a corresponding one of the N multiplexers into Y split light beams, where Y is a smallest natural number satisfying MN/K≤Y; Y N×K delivery and coupling (DC) switches each of which selects, from among the split light beams from the N optical splitters, a split light beam corresponding to one multiplexer among the N multiplexers, the DC switches each including N 1×K optical splitters to which outputs from the N optical splitters are connected, and K N×1 optical switches which are connected to output ports of each of the N 1×K optical splitters; and MN tunable filters each of which selects a light beam with any one wavelength from among the light beams with the at most M different wavelengths multiplexed by the one multiplexer selected by a corresponding one of the K N×1 optical switches.

Preferably, the above optical switch devices further comprise at most M light sources each of which generates a light beam with one wavelength among light beams with the at most M different wavelengths, includes a means for modulating the light beam with an electrical signal, and outputs the modulated light beam with the one wavelength, the at most M light sources and a corresponding one of the N multiplexers constitute a wavelength group generator, and the MN tunable filters each select a modulated light beam with any one wavelength.

Also, at least either the N optical splitters or the optical splitters in the DC switches can each be configured by combining an optical splitter and a wavelength selective switch. Further, the K N×(MN/K) DC switches can be M N×N DC switches.

The above optical switch devices can further comprise one or more optical amplifiers at at least one of a preceding stage and a following stage of each of the N optical splitters. Also, each of the multiplexers may include a plurality of arrayed waveguide gratings (AWGs), and one of an optical combiner, an interleaver, and a wavelength selective switch which further combine multiplexed light beams from the plurality of AWGs.

According to still another aspect of the present disclosure, an optical switch device is provided which comprises N M-input L-output multiplexers each of which multiplexes light beams with at most M (M is a natural number larger than or equal to 2) different wavelengths and outputs a multiplexed light beam, each of the light beams with the at most M different wavelengths is a light beam with one wavelength selected from different wavelength groups each including L (a natural number satisfying M>L) types of wavelengths, MN/L is a natural number, and the optical switch device further comprises: L N-input wavelength splitting-selection units to each of which corresponding N output ports among sets of L output ports of the N multiplexers are connected and the multiplexed light beams are input from the corresponding N output ports, the N-input wavelength splitting-selection units each including N optical splitters which are respectively connected to the N inputs of the wavelength splitting-selection unit and each split the multiplexed light beam from a corresponding one of the N multiplexers into MN/L split light beams, and MN/L N×1 optical switches each of which selects, from among the split light beams from the N optical splitters, a split light beam corresponding to one multiplexer among the N multiplexers; and MN/L tunable filters each of which selects a light beam with any one wavelength from among the light beams with the different wavelengths multiplexed by the one multiplexer selected by a corresponding one of the MN/L N×1 optical switches.

Preferably, the above optical switch device can further comprise at most M light sources each of which generates a light beam with one wavelength among light beams with the at most M different wavelengths, includes a means for modulating the light beam with an electrical signal, and outputs the modulated light beam with the one wavelength, and the at most M light sources and a corresponding one of the multiplexers can constitute a wavelength group generator.

Also, the above optical switch device can be such that the multiplexers are cyclic multiplexers, and the MN/L tunable filters are each configured to select a modulated light beam with any one wavelength among M different wavelengths for the whole set of N multiplexers, or the multiplexers are non-cyclic multiplexers, and the MN/L tunable filters are each configured to select a modulated light beam with any one wavelength among (M+(L−1)) different wavelengths for the whole set of N multiplexers.

Also, the L different types of wavelengths in each of the wavelength groups can include a start wavelength being one of M successively set wavelengths, and (L−1) wavelengths adjacent to the start wavelength. Further, the above optical switch devices can functions as a wavelength routing switch in which MN modulation means of a plurality of light sources connected to the N multiplexers correspond to input ports of an optical circuit switching switch, and MN outputs of the tunable filters correspond to output ports of the optical circuit switching switch.

In the present disclosure, a large-scale optical circuit switching-type optical switch device that costs less than the conventional technique is presented. In the optical switch device in the present disclosure, fixed-wavelength light sources can be used. This can make the light source configuration simpler than those in the conventional technique and greatly reduce the circuit scale and the cost. A configuration will also be presented in which wavelength-tunable light sources that use a wavelength tuning function within a very narrow range and tunable filters are combined to reduce the channel loss in the wavelength routing SW and further simplify the configuration of the wavelength routing SW.

Figure 4:
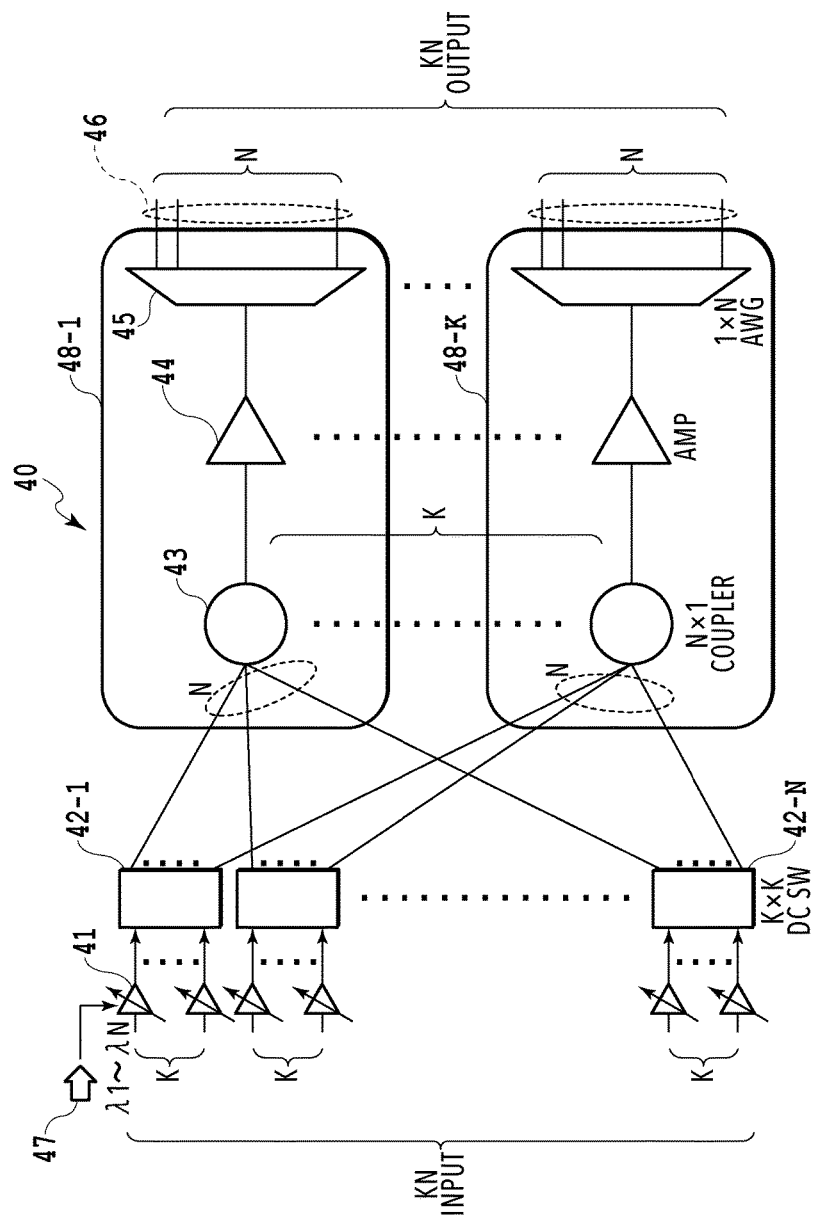
FIG. 4 is a diagram illustrating a configuration of a wavelength routing SW in a conventional technique having wavelength routing units arranged in parallel.

Before describing specific configurations and operations of the optical switch device in the present disclosure, the configurations and operations of basic constituent devices used will be briefly described. Most of the constituent devices are common to those used in the wavelength routing SW (optical switch device) in the conventional technique illustrated in FIG. 4 to FIG. 6.

Figure 7A:
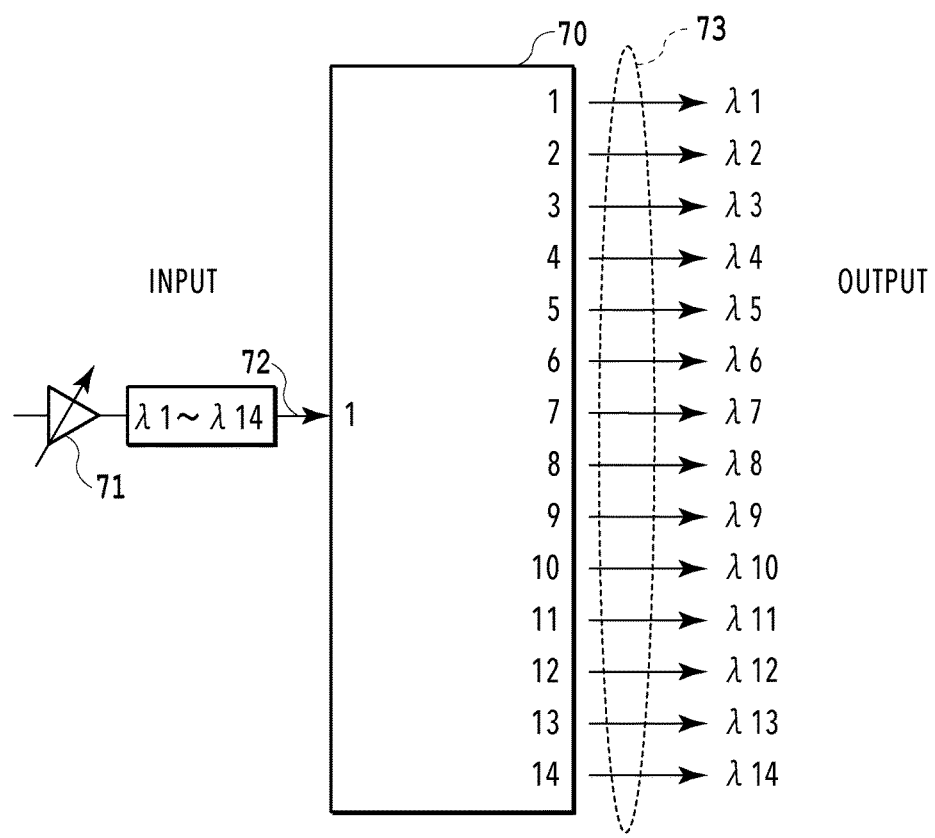
FIG. 7A is a diagram illustrating the configuration of an AWG with a 1×N configuration.
Figure 7B:
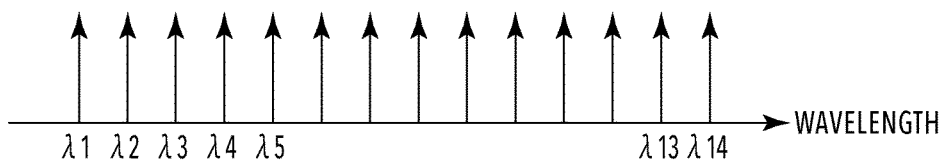
FIG. 7B is a diagram explaining the operation of an arrayed waveguide grating.

FIG. 7A and FIG. 7B are diagrams explaining the configuration and operation of an arrayed waveguide grating (AWG). The AWG is the wavelength routing SW in the present disclosure and used as a device preferable as a multiplexer or a demultiplexer. FIG. 7A illustrates the configuration of a 1×N AWG and exemplarily illustrates one having 1 input port 72 and 14 output ports. A wavelength-tunable LD 71 is connected to the input port 72 of an AWG 70. When the wavelength-tunable LD 71 is set to one of wavelengths $\lambda_1$ to $\lambda_{14}$, an optical signal from the input port is output to the output port 73 at the position corresponding to the wavelength of the optical signal (one of the first to 14th ports). As illustrated in FIG. 7B, when a multiplexed light beam obtained by multiplexing optical signals with the wavelengths $\lambda_1$ to $\lambda_{14}$ (wavelength group), which are different from each other on a wavelength axis, is input into the input port 72, the multiplexed light beam is demultiplexed into the individual wavelengths at the output ports 73.

Figure 8A:
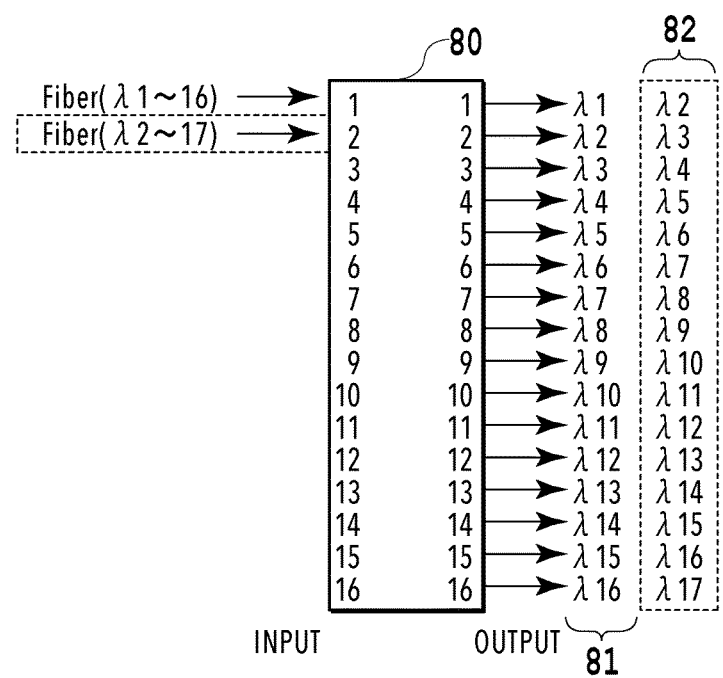
FIG. 8A is a diagram explaining the demultiplexing operation of a non-cyclic AWG.
Figure 8B:
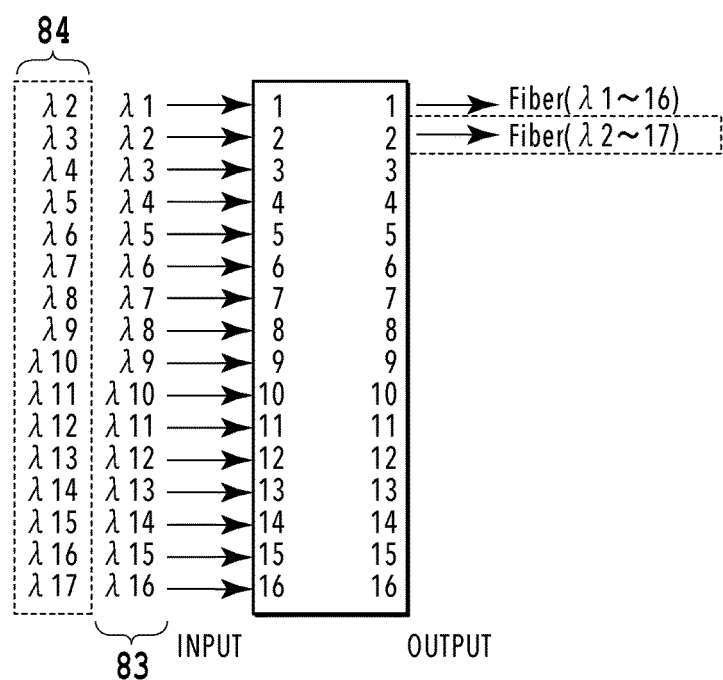
FIG. 8B is a diagram explaining the multiplexing operation of the non-cyclic AWG.

FIG. 8A and FIG. 8B are diagrams explaining the configuration and operation of a non-cyclic AWG. FIG. 8A illustrates the demultiplexing operation of a non-cyclic AWG 80 with a 16×16 configuration. The non-cyclic AWG 80 has 16 input ports and, as the input port into which to input an optical signal is shifted by one port, the position of the output port to which to output the optical signal with the same wavelength is shifted by one port. For example, in a case where a wavelength group 81 of $\lambda_1$ to $\lambda_{16}$ are output to the output ports when a multiplexed light beam with $\lambda_1$ to $\lambda_{16}$ is input into the first input port, a wavelength group 82 of $\lambda_2$ to $\lambda_{17}$ are output to the output ports when a multiplexed light beam with $\lambda_2$ to $\lambda_{17}$ is input into the second input port. Even if $\lambda_1$ is input into the second input port, it will scatter and disappear inside the AWG and will not appear at any output port.

FIG. 8B illustrates a case where the AWG is caused to operate as a multiplexer by switching the inputs and the outputs and thereby reversing the direction of optical signals. It can be seen that, in the multiplexing, the position of the output port shifts by one port as the wavelengths into the respective input ports are shifted by one wavelength interval. Also, it is to be noted that the fact that changing the input wavelengths changes the position of the output port for the optical signal can be rephrased as that the output port to which to output a signal light beam is selected by the wavelengths of the optical signals input into the input ports, which is a function of selecting the output port based on the wavelengths of the input light beams. This feature is used in embodiment 6 to be described later. The specific wavelengths to be multiplexed and demultiplexed can be freely set by setting the AWG's setting parameters as appropriate. For example, the wavelength of each port can be set to match a wavelength on the ITU-T grid.

Figure 9A:
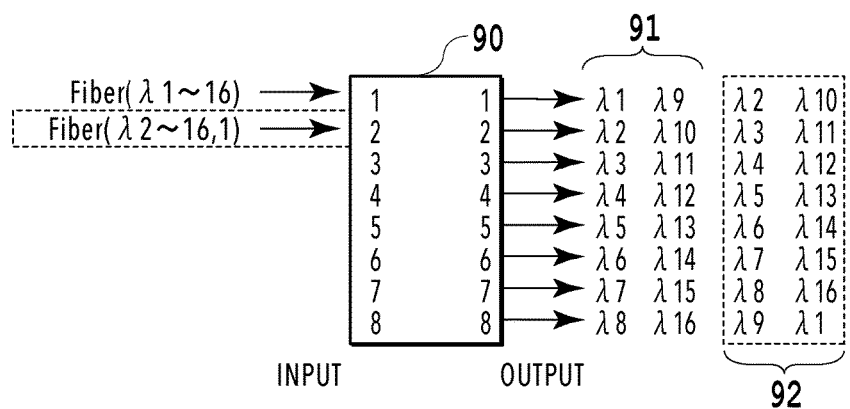
FIG. 9A is a diagram explaining the demultiplexing operation of a cyclic AWG.
Figure 9B:
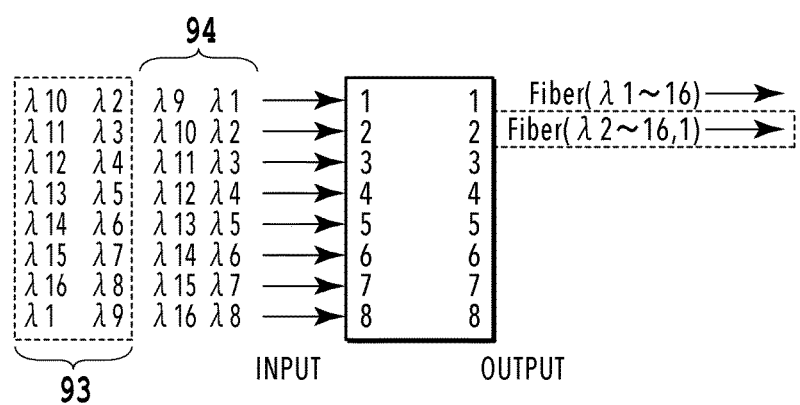
FIG. 9B is a diagram explaining the multiplexing operation of the cyclic AWG.

FIG. 9A and FIG. 9B are diagrams explaining the configuration and operation of a cyclic AWG. FIG. 9A illustrates the demultiplexing operation of a cyclic AWG 90 with an 8×8 configuration. In the cyclic AWG 90, its FSR (Free Spectral Range) is set to be N times as large as a wavelength interval (frequency interval) A, so that wavelengths are output to the same output port periodically at repetitive intervals of the FSR. In the example of FIG. 9A, when the FSR of the cyclic AWG, which has eight input ports and eight output ports, is set to be eight times as large as the wavelength interval A (e.g. 50 GHz) (400 GHz), wavelengths apart from each other by one cycle, which is eight intervals, repetitively appear at a single output port of the cyclic AWG. In the demultiplexer illustrated in FIG. 9A, upon input of $\lambda_1$ to $\lambda_{16}$ into the first input port, $\lambda_1$ and $\lambda_9$, $\lambda_2$ and $\lambda_{10}$, . . . , and $\lambda_8$ and $\lambda_{16}$ are output to the first, second, . . . , and eighth output ports, respectively, as illustrated by reference sign 91. As in the non-cyclic AWG illustrated in FIG. 8A, shifting the input port by one port results in a shift of the position of the output port at which the same wavelength appears, as illustrated by the wavelength numbers indicated by reference sign 92.

FIG. 9B illustrates a case where the AWG is caused to operate as a multiplexer by switching the inputs and the outputs and thereby reversing the direction of optical signals. As in the non-cyclic AWG, the AWG operates as a multiplexer with the feature of the cyclic AWG that causes wavelengths (numbers) appear at the same output port periodically in a cycle equal to the number of ports. The AWG, likewise, has the function of selecting the output port based on the wavelengths of the input light beams.

Figure 5:
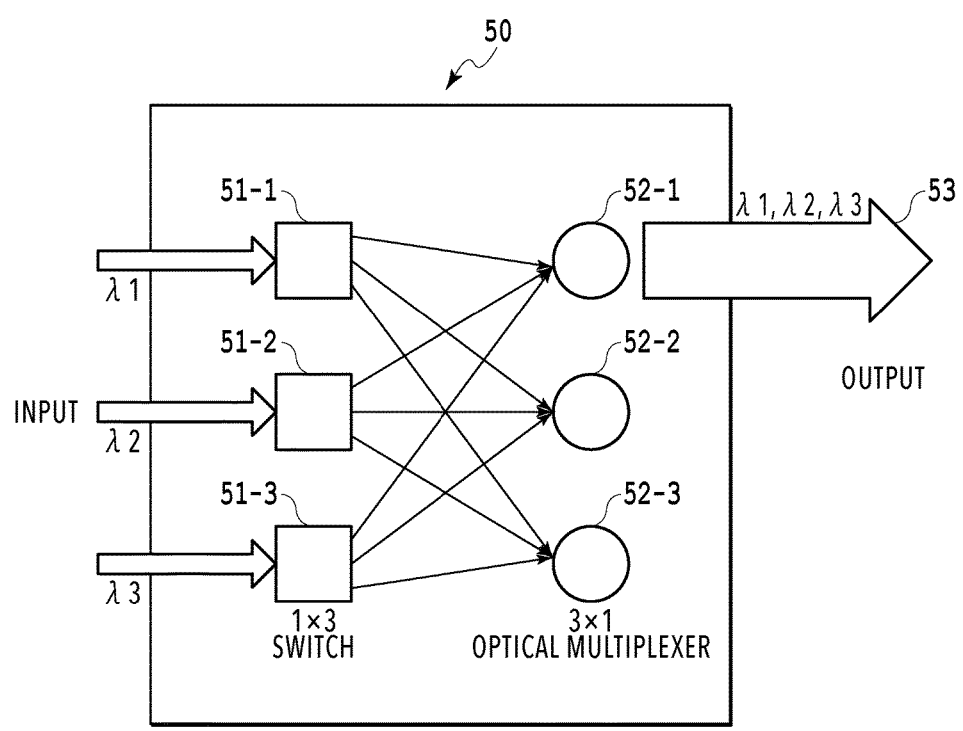
FIG. 5 is a diagram illustrating a configuration example of a DC switch used in the wavelength routing SW in the conventional technique.
Figure 6:
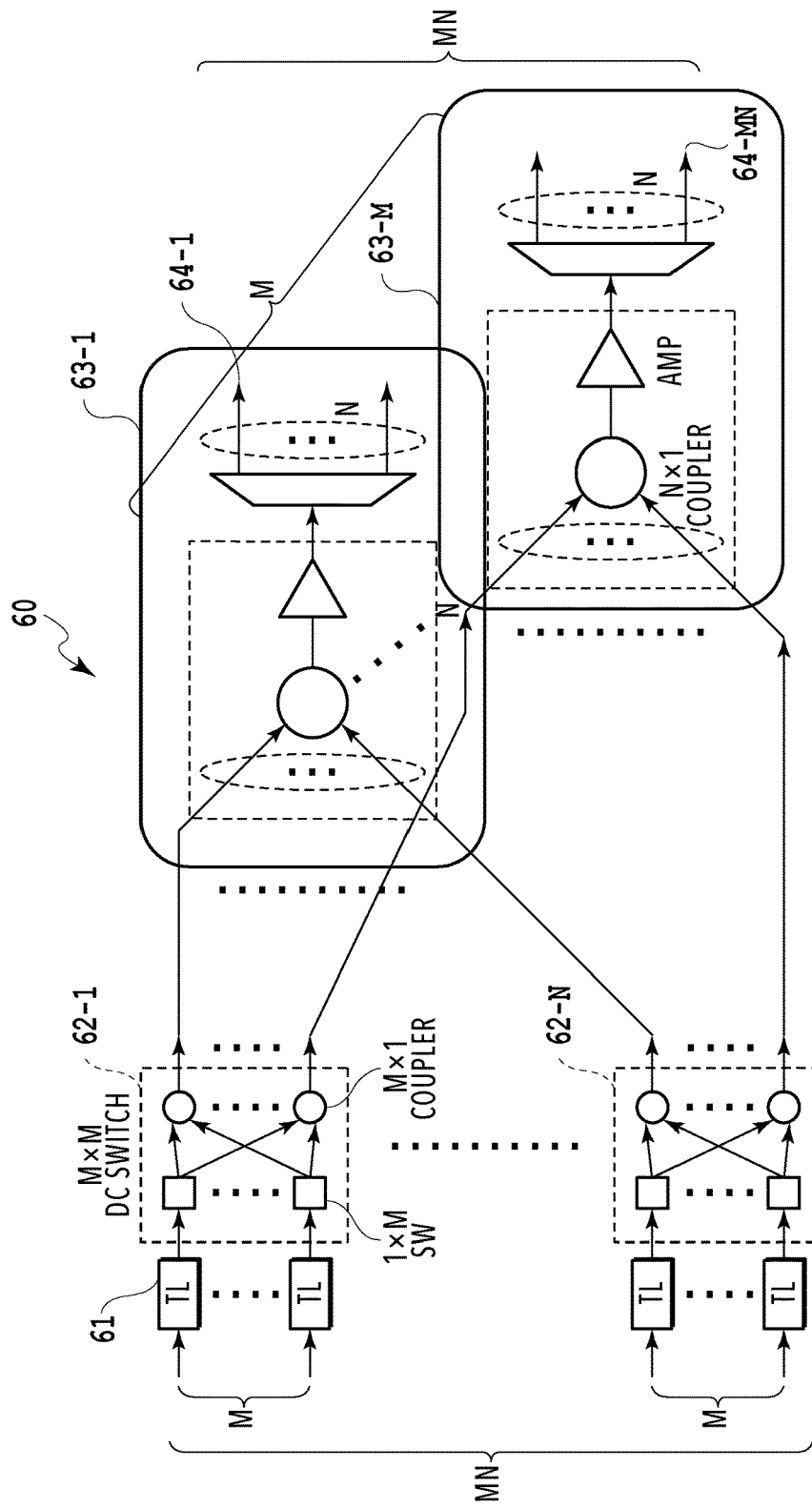
FIG. 6 is a diagram illustrating another configuration of the large-scale wavelength routing SW in the conventional technique.

As for other constituent devices, the DC switch including the switches and the couplers explained in FIG. 5 is used as well. Besides the above-mentioned devices, various devices are employable as the constituent devices used in the wavelength routing SW in the present disclosure, and the embodiments to be described below will be presented as modes of usage of various different types of devices. The configuration and operation of the wavelength routing SW in the present disclosure will now be described through various embodiments with drawings.

Embodiment 1

In the following description, the wavelength routing SW in the present disclosure (optical switch device) is exemplarily presented as one in which the number of input ports corresponds to the number MN of light sources, and the number of output ports is also MN. However, the number of input ports and the number of output ports do not necessarily need to be equal as long as all information signals (electrical signals) into the input ports can each be switched to any target output port. Specifically, even with a configuration in which the number of input ports is smaller than the number of output ports, it equivalently functions as the wavelength routing SW. It is therefore to be noted that none of the following embodiments is limited to the configuration in which the number of input ports and the number of output ports are equal.

Figure 10:
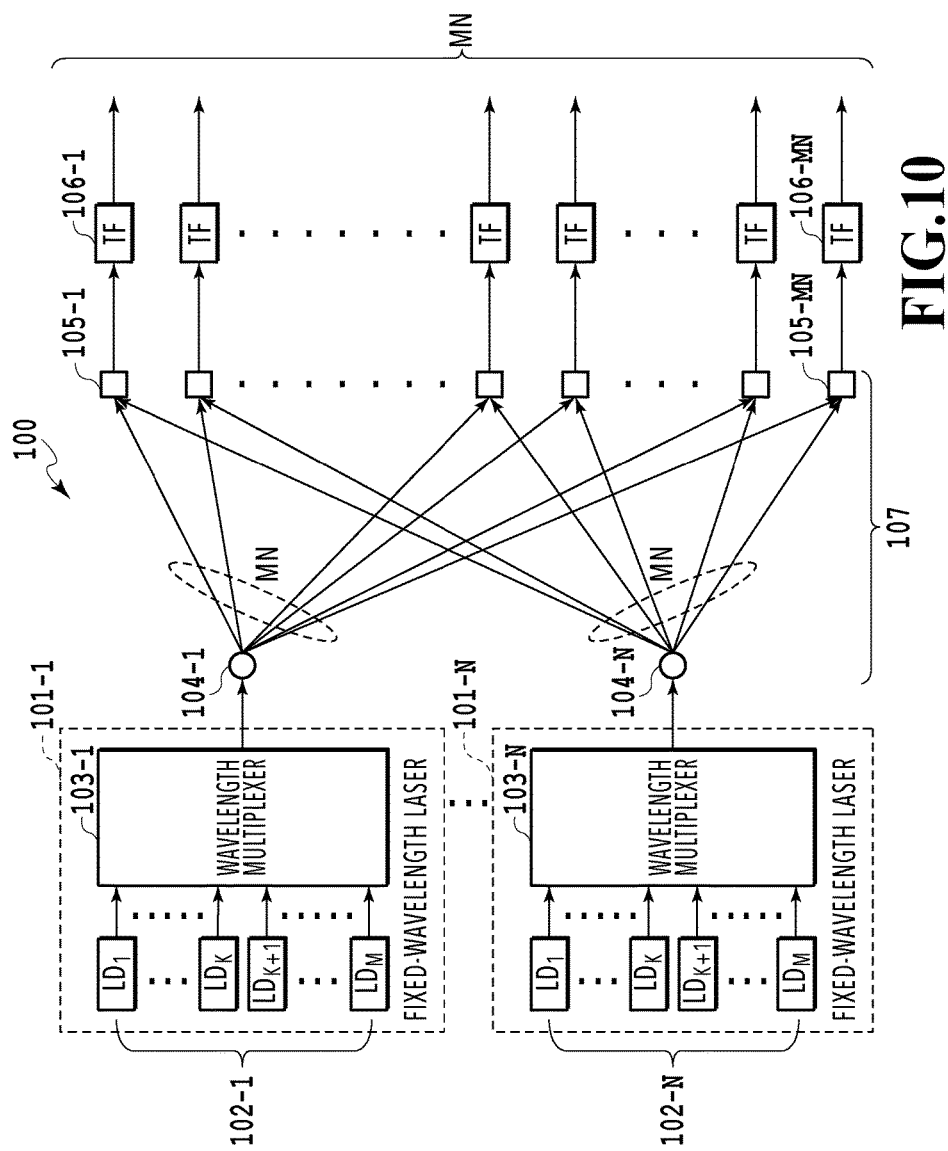
FIG. 10 is a diagram illustrating the most basic configuration (embodiment 1) of a wavelength routing SW in the present disclosure.

FIG. 10 is a diagram illustrating the most basic configuration for the wavelength routing in the present disclosure. Broadly speaking, a wavelength routing SW (optical switch device) 100 includes N wavelength group generators 101-1 to 101~N, a splitting-selection unit 107, and MN tunable filters (TFs) 106-1 to 106-MN. Each of the N wavelength group generators, e.g., focusing on the wavelength group generator 101-1, has a group 102-1 of M fixed-wavelength lasers each fixed at one of M different wavelengths $\lambda_1$ to $\lambda_M$. Light beams with the M different wavelengths are modulated by respective information signals not illustrated. The M modulated light beams are multiplexed by a multiplexer 103-1 and output as a multiplexed light beam from the wavelength group generator 101-1. In the wavelength routing SW 100 as a whole, there are N sets of M fixed-wavelength LDs (101-1 to 101-N). Thus, the output light beams from the MN fixed-wavelength LDs carry mutually different information signals. As in the wavelength routing SW in the conventional technique, the MN light sources, into which the information signals are inputtable, correspond to the MN input ports. What should be noted here is that the output light wavelengths set for the light sources (LDs) are fixed in the wavelength routing SW in the present disclosure, which is a large difference from the conventional technique, in which wavelength-tunable LDs are used.

The N multiplexed light beams from the respective N wavelength group generators are each split and selected by the splitting-selection unit 107. As a result, MN split and selected multiplexed light beams are output which contain information signals to be selected to at target output ports. More specifically, the splitting-selection unit 107 includes N optical splitters (front stage) 104-1 to 104-N each of which splits the multiplexed light beam with a wavelength group from a single wavelength group generator into MN light beams, and MN N×1 optical switches (rear stage) 105-1 to 105-MN each of which selects one of the multiplexed light beams from the N wavelength group generators. Each of the N optical splitters (front stage) 104-1 to 104-N may just need to be capable of splitting the multiplexed light beam from the corresponding one of the wavelength group generators into MN light beams. However, each of the N optical splitters (front stage) 104-1 to 104-N may also be one having wavelength selectivity as long as it can selectively split the multiplexed light beam for the target output ports, as will be described later. The MN N×1 optical switches (rear stage) 105-1 to 105-MN each have a function of selecting one of the N wavelength group generators and operate so as to select the multiplexed light beam ($\lambda_1$ to $\lambda_M$) from the single wavelength group generator including the routing target input port among the MN input ports.

The outputs of the MN N×1 optical switches 105-1 to 105-MN of the splitting-selection unit 107 are connected to the tunable filters (TFs) 106-1 to 106-MN, respectively. Each TF is a filter capable of selecting an optical signal with any one wavelength from a multiplexed light beam with a plurality of wavelengths. The MN TFs correspond to the MN output ports of the wavelength routing SW 100. Each one of the MN TFs selects the modulated optical signal containing the information signal corresponding to any one LD among the MN fixed-wavelength LDs. As a result, a channel from the input port corresponding to that LD to the output port corresponding to that TF is set. As mentioned earlier, the number of fixed-wavelength LDs in each of the N wavelength group generators is at most M, and the number of fixed-wavelength LDs may be smaller than M in all or some of the wavelength group generators. The number of light sources may be different from one wavelength group generator to another. Thus, the MN tunable filters (TFs) each operate so as to select a light beam with any one wavelength from among the light beams with the at most M different wavelengths multiplexed by the single multiplexer selected by the corresponding one of the MN N×1 optical switches.

The following is a specific example of the wavelength routing operation. For example, the M-th fixed-wavelength LD in the first wavelength group generator 101-1 has the fixed wavelength $\lambda_M$, and assume that this fixed-wavelength LD is modulated by an information signal M. The modulated optical signal with $\lambda_M$ is multiplexed to the optical signals with the other wavelengths by the multiplexer 103-1, and a multiplexed light beam containing the optical signal with $\lambda_M$ is output from 101-1. The multiplexed light beam is split into MN light beams by the optical splitter 104-1 and is connected to the MN-th N×1 optical switch 105-MN too. The multiplexed light beams from the N optical splitters 104-1 to 104-N are input into the MN-th N×1 optical switch 105-MN, yet the split multiplexed light beam from the optical splitter 104-1 is selected from among them. The multiplexed light beam selected by the optical switch 105-MN contains the optical signal with $\lambda_M$, which has been modulated by the above-mentioned information signal M. Further, only the optical signal with $\lambda_M$ is selected from this selected multiplexed light beam by the MN-th TF Thus, the optical signal modulated by the information signal M can be obtained from the MN-th output port. Consequently, a channel from the M-th input port to the MN-th output port is formed, thereby achieving wavelength routing from the M-th input port to the MN-th output port in the MN×MN optical switch.

In the wavelength routing SW in the conventional technique, the wavelength of the light beam from each light source on the input port side is tunable to enable any output port to be selected. This allows any channels to be set between the input ports and the output ports. In contrast, in the wavelength routing SW in the present disclosure, the wavelength of the light beam from each light source on the input port side is fixed while TFs are disposed at the last stage on the output port side. This allows any channels to be set between the input ports and the output ports by using the wavelength selecting function of the TFs. Hence, there is a large difference in configuration from the conventional technique in that the ability to set the routing-target channels in the wavelength routing and the freedom in the selection are imparted not by the wavelengths set for the light beams from the light sources but by the wavelengths selected by the TFs at the last stage.

As described above, the wavelength routing SW in the present disclosure has a large difference from the conventional technique in that each wavelength group generator uses fixed-wavelengths light sources (LDs) to generate signal light beams that carry information signals. This contrasts with the fact that the wavelength routing SW in the conventional technique, illustrated in FIG. 4 and FIG. 6, requires a complicated control mechanism for stable operation across a wide wavelength range and employs wavelength-tunable light sources with a larger circuit scale and a higher cost. A wavelength-tunable LD, even if it is a state-of-art product, essentially requires a light source itself and, in addition, an accompanying control circuit for implementing a wavelength tuning function. To increase the scale of an optical switch, one may attempt to widen the wavelength range of a light source from the C-band to another band such as the L-band. However, a wavelength-tunable LD which can stably operate across different bands has not yet been made. Also, to increase the number of ports in an optical switch device, one may attempt to increase the number of wavelengths by narrowing the wavelength intervals. Doing so, however, makes wavelength accuracy requirements stricter. On the other hand, with fixed-wavelength light sources, the accompanying control mechanism is simple and an inexpensive general-purpose product can be easily obtained, and therefore the cost is significantly lower as compared to the case with wavelength-tunable light sources.

In the present disclosure, as many TFs as the output ports are needed. However, various types of TFs are usable. For example, there are a filter obtained by combining an AWG and a switch, a filter using an AO (Acousto-Optic) effect, a ring resonator-type filter made by silicon photonics, a Mach-Zehnder interferometer-type filter made by silicon photonics, and so on. A resonator-type filter made by silicon photonics is particularly preferable for the TFs in the present disclosure in view of size and cost reduction. The wavelength selecting function of the TFs can be implemented at a lower cost than the wavelength tuning function of wavelength-tunable LDs and can use components that is high in versatility and obtainable at a lower cost. Thus, the TFs are more preferable for providing a large-scale wavelength routing SW.

For example, an arrayed waveguide grating (AWG) is usable as each of the multiplexers 103-1 to 103-N in the wavelength group generators. Besides this, a bulk diffraction grating, an optical multiplexer (coupler), and so on are usable as well. As each of the optical splitters 104-1 to 104-N, a 1×MN optical coupler that splits a light beam substantially uniformly is usable as one with the simplest configuration. A wavelength selective switch (WSS) having a wavelength selecting function is also usable. A WSS is a device that, upon input of a wavelength-multiplexed light beam into its input, can output any of the wavelengths in any combination to any output ports. With a simple optical splitter, a loss (dB) occurs in accordance with 10 log(n), where n is the number of splits. Then, when the number of splits is, for example, 100, the loss increases to 20 dB. On the other hand, with a one-input L-output (1×L) WSS, it is possible to make a configuration with a smaller loss than an optical coupler with the same number of splits (e.g. about 7 dB when the number of splits is 20).

In the wavelength routing SW in the present disclosure, the optical splitters 104-1 to 104-N may each just need to split the multiplexed light beam from one wavelength group generator among the N wavelength group generators for the TFs, the number of which is equal to the number of output ports (MN). Here, the optical signals with the wavelengths that are not selected by a target TF at the last stage do not need to be split and supplied to that target TF in the first place. Thus, although it is not necessary to use the wavelength selectivity of a WSS, the wavelength selecting function of the WSS may be used instead of an optical splitter. In this way, it is possible to select a necessary channel from the wavelength group generator including the selected input port to the target TF with a smaller loss.

As the WSS, a wavelength selective switch made with 3D MEMS, a demultiplexer, and a wavelength selective switch (WSS) obtained by combining a 1×N switch and a demultiplexer are usable. Also, the optical splitters 104-1 to 104-N can be obtained not only by using an optical coupler or a WSS but also by combining an optical coupler an a WSS. Further, in a case where the number of splits is large, various modifications are usable such as an optical coupler with a multi-stage configuration, a WSS with a multi-stage configuration, an optical coupler and WSSs cascaded to each other, and a WSS and optical couplers cascaded to each other. Details will be described in embodiment 7.

With the wavelength routing SW in embodiment 1 of the present disclosure, illustrated in FIG. 10, an optical switch device which is completely equivalent to the conventional technique can be obtained by using fixed-wavelength light sources, which are low in cost, optical couplers, optical switches, and TFs. An optical switch device can be obtained at low cost. Consequently, it is possible to obtain a large-scale optical switch device while suppressing increase in cost. As constituent components such as the fixed-wavelength light sources, smaller and less expensive products than those in the conventional technique are usable and an optical switch device of a large scale over 1000×1000 can be obtained therewith. For example, a 300×300 optical switch device can be obtained with the number M of fixed-wavelength light sources=100 and the number N of wavelength group generators=3. Further, a 1000×1000 optical switch device can be obtained with the number M of fixed-wavelength light sources=100 and the number N of wavelength group generators=10. The selection of M and N includes various combinations and modifications and is not at all limited to the numerical values in the above examples. The optical switch device (wavelength routing SW) in the present disclosure is preferably used in a data center and the like and can contribute to significant reduction of the power consumption at the data center.

Embodiment 2

The configuration in the above embodiment 1 is such that each of the optical splitters 104-1 to 104-N in the splitting-selection unit splits the multiplexed light beams from a wavelength group generator into as many light beams as the number of output ports (MN) at once. Here, with an optical splitter such as an optical coupler, a loss (dB) occurs in accordance with 10×log(n) based on the number n of splits. Thus, it is necessary to adjust the level diagram by inserting an optical amplifier at a given position along each optical signal channel in the optical switch device. Making each optical splitter with a multi-stage configuration does not change the loss as a whole but enables more flexible arrangement of an optical amplifier for the level diagram adjustment. An embodiment of the present disclosure in which each optical splitter is made with a multi-stage configuration will be described below.

Figure 11:
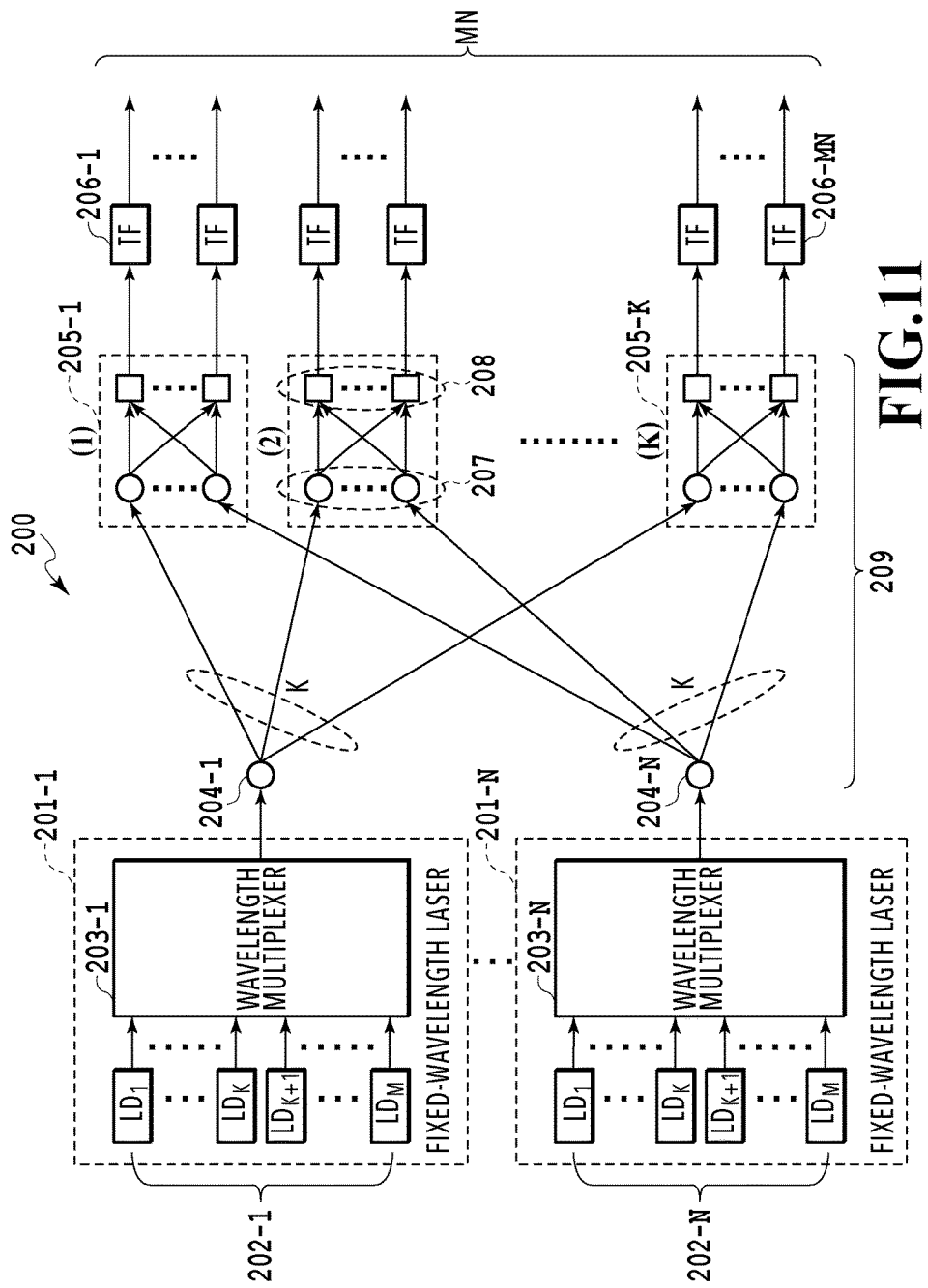
FIG. 11 is a configuration diagram of embodiment 2 of the wavelength routing SW in the present disclosure.

FIG. 11 is a diagram illustrating the configuration of embodiment 2 of the wavelength routing SW in the present disclosure. A wavelength routing SW (optical switch device) 200 includes N wavelength group generators 201-1 to 201~N, a splitting-selection unit 209, and MN tunable filters (TFs) 206-1 to 206-MN. In this embodiment, besides the splitting-selection unit 209, the configurations of the wavelength group generators 201-1 to 201-N and the TFs are exactly the same as those in embodiment 1, and the configurations of the input ports and the output ports are the same as well. In the following, the description will focus on the difference of the configuration of the splitting-selection unit 209 from embodiment 1.

The splitting-selection unit 209 in embodiment 2 includes N 1×K optical splitters 204-1 to 204-N each of which splits a wavelength-multiplexed light beam from a single wavelength group generator into K light beams, and K N×(MN/K) DC switches (rear stage) 205-1 to 205-K each of which selects one of the multiplexed light beams from the N wavelength group generators 201-1 to 201-N. It is to be noted that the DC switches 205-1 to 205-K are each similar to the DC switch with the 3×3 configuration illustrated in FIG. 5, but the direction of optical signals is opposite to the direction in the DC switch used in the conventional technique. In embodiment 2, each of the DC switches 205-1 to 205-K includes N 1×(MN/K) optical splitters 207 and (MN/K) optical switches 208 with an N×1 configuration.

As mentioned above, focusing on the output of, for example, the wavelength group generator 201-1, the splitting-selection unit 209 includes the 1×K optical splitter 204-1 at the first stage and K 1×(MN/K) optical splitters 207 at the second stage cascaded to this. Thus, the multiplexed light beam output from the wavelength group generator 201-1 is split for MN channels by the cascaded optical splitters with the two-stage configuration. The splitting-selection unit 209 in this embodiment will be understood as being practically completely the same in configuration as the splitting-selection unit 107 in embodiment 1.

As in embodiment 1, the N optical splitters 204-1 to 204-N and the N 1×(MN/K) optical splitters 207 in each DC switch may each have wavelength selectivity as long as it can split a single multiplexed light beam for the TF at the target output port. Specifically, as an optical splitter with the simplest configuration, it is possible to use a 1×K or 1×(MN/K) optical coupler that splits a light beam substantially uniformly or a wavelength selective switch (WSS) having a wavelength selecting function. Further, it is possible to use a combination of an optical splitter and a wavelength selective switch, and the order of the optical splitter and the wavelength selective switch may be either way in the front-rear direction.

The wavelength routing SW in this embodiment, illustrated in FIG. 11, represents a configuration in which the optical splitters or wavelength selective switches (204-1 to 204-N) each split a multiplexed light beam into K light beams (K that makes MN/K an integer), the numbers of input ports and output ports of the optical switch device are both MN, and there is no unused port on the output side. It is, however, needless to say that the optical switch device in the present disclosure is not limited only to a configuration as illustrated in FIG. 11, in which there is no remaining input or output port (unused port). A more generalized configuration example of this embodiment that tolerates the presence of an unused port will be described later as embodiment 8.

In this embodiment, the multi-stage optical splitters in the splitting-selection unit 209 have been described as including optical splitters at the first stage and DC switches with optical splitters at the second stage. This is because DC switches with various combinations of the number of input ports and the number of output ports are commercially available and easily obtainable general-purpose products, and this embodiment is not limited to the use of the DC switches. The configuration of embodiment 2 is characterized in that each optical splitter in the splitting-selection unit 209 is made with a multi-stage configuration. It is to be noted that the choice of specific devices to make the elements are not at all limited to the above-described example.

Embodiment 3

Figure 12:
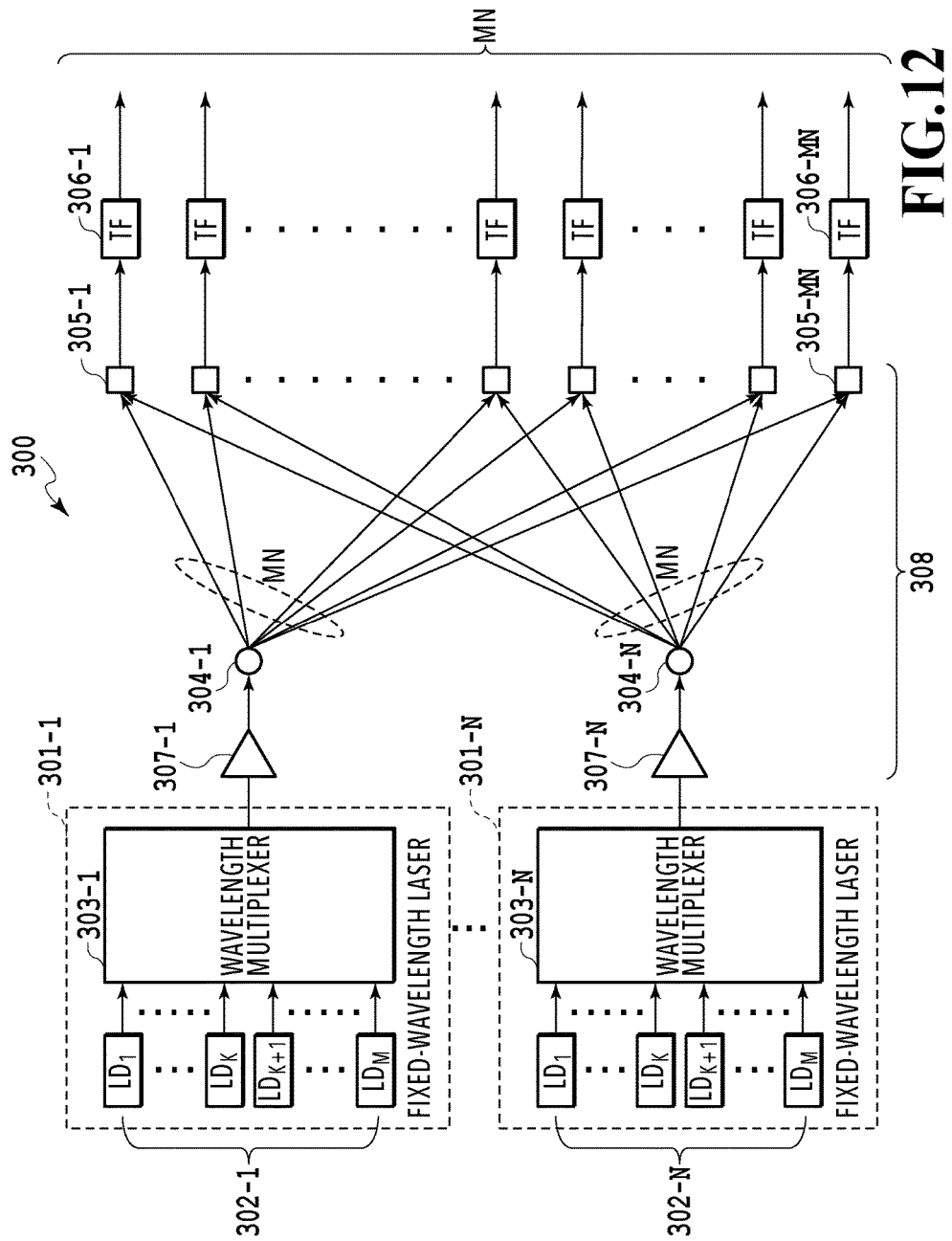
FIG. 12 is a configuration diagram of embodiment 3 of the wavelength routing SW in the present disclosure.

FIG. 12 is a diagram illustrating the configuration of embodiment 3 of the wavelength routing SW in the present disclosure. A wavelength routing SW (optical switch device) 300 includes N wavelength group generators 301-1 to 301-N, a splitting-selection unit 308, and MN tunable filters (TFs) 306-1 to 306-MN. The wavelength routing SW in this embodiment is substantially the same as the configuration of embodiment 1, and the configurations of the input ports and the output ports are the same as well. In this embodiment, optical amplifiers 307-1 to 307-N are further provided between the wavelength group generators and corresponding portions of the splitting-selection unit. As mentioned earlier, at the splitting-selection unit 308, the multiplexed light beam from each wavelength group generator is split into as many light beams as the number MN of output ports, and the channel loss occurs in accordance with the number of splits. It is also necessary to consider the excess loss at the optical switches, the multiplexers, and so on. Even after switching channels in an optical switch device, it is still necessary to maintain the output optical signals at a certain optical power level. Hence, in the optical switch device, it is preferable to insert optical amplifiers that compensate for the decrease in the level diagram.

In order to minimize the number of optical amplifiers, which are expensive, the positions to insert the optical amplifiers are limited to portions where many optical signals are multiplexed. In the wavelength routing SW in the present disclosure, as in this embodiment, an optical amplifier can be inserted at each of the output stages of the wavelength group generators 301-1 to 301-N. In the wavelength routing SW in the present disclosure, the number MN of input and output ports, which represents the scale of the optical SW, is determined by the number M of types of wavelengths included in a single wavelength group generator and the number N of wavelength group generators (wavelength groups). Thus, the optical switch device in the present disclosure is also characterized by its flexibility in design achieved via combination of the number M of types of wavelengths and the number N of wavelength groups that makes it possible to select the configuration of the optical switch device in accordance with restrictive requirements and the like on each device to be used that vary from one situation to another.

For example, since wide-band optical amplifiers are generally expensive, the configuration can be such that the number M of types of wavelengths is reduced while the number N of wavelength groups is increased and amplifiers with a relatively narrow band are used. If, on the other hand, wide-band optical amplifiers can be obtained inexpensively, the configuration can be such that the number M of types of wavelengths is increased while the number N of wavelength groups is reduced. Also, when the number M of wavelengths is the same, the intervals between the light source wavelengths may be selected to be narrow. In this case, optical amplifiers with a narrow wavelength band may just need to be used. In this way, cost reduction is possible. The intervals between the light source wavelengths can also be determined by the stability of the fixed-wavelength light sources, the accuracy of the TFs, and so on. Also, if the wavelength range within which the TFs can operate is sufficiently wide, the M wavelengths to be generated by each wavelength group generator may overlap those of other wavelength group generators or completely differ from them.

Embodiment 4

Figure 13:
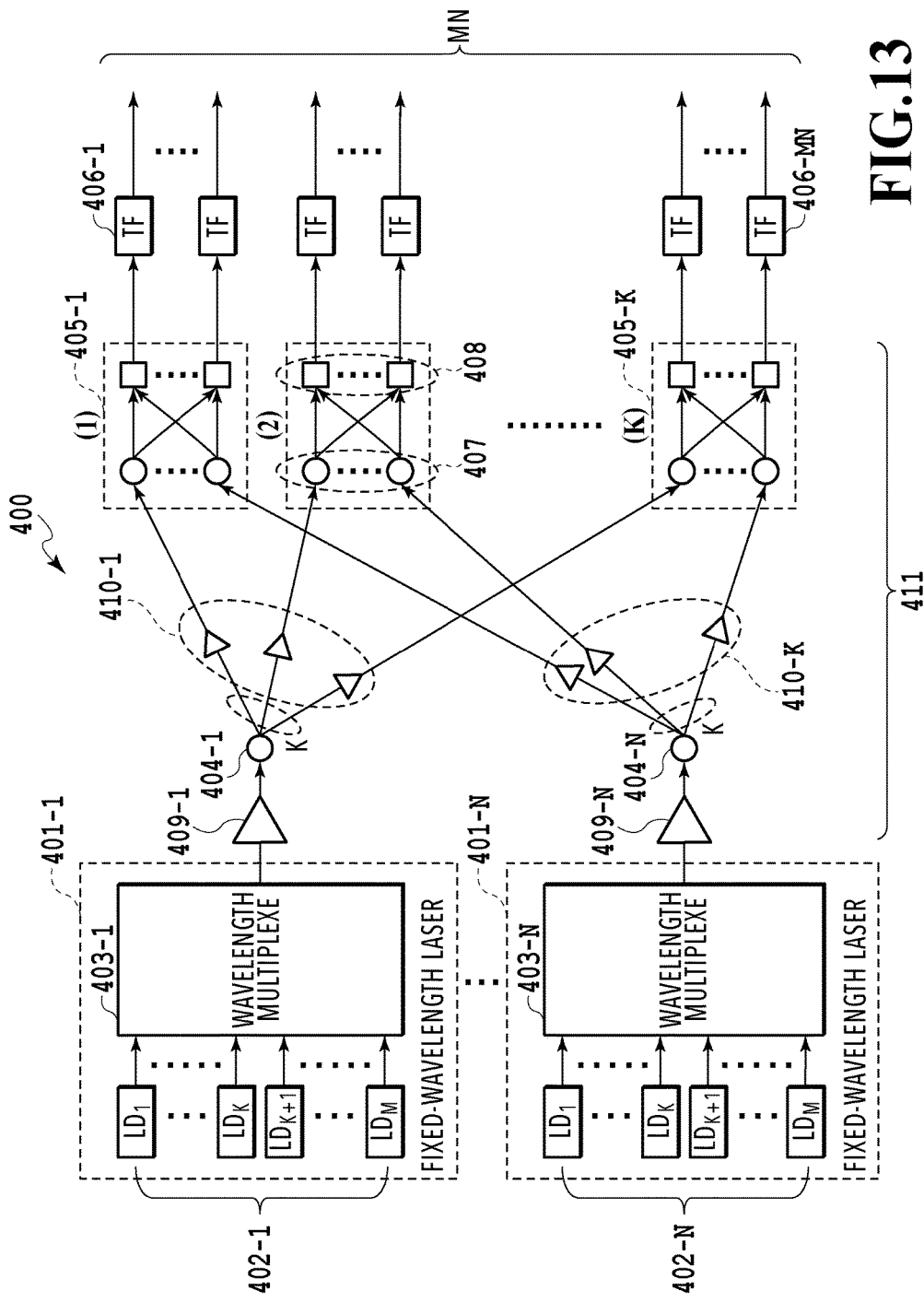
FIG. 13 is a configuration diagram of embodiment 4 of the wavelength routing SW in the present disclosure.

FIG. 13 is a diagram illustrating the configuration of embodiment 4 of the wavelength routing SW in the present disclosure. A wavelength routing SW (optical switch device) 400 includes N wavelength group generators 401-1 to 401-N, a splitting-selection unit 411, and MN tunable filters (TFs) 406-1 to 406-MN. The wavelength routing SW in this embodiment is substantially the same in configuration as embodiment 2, and the configurations of the input ports and the output ports are the same as well.

In this embodiment, optical amplifiers 409-1 to 409-M are further provided between the wavelength group generators and corresponding portions of the splitting-selection unit, or optical amplifiers 410-1 to 410-K are further provided between optical splitters 404-1 to 404-N and corresponding DC switches 405-1 to 405-K. In the example illustrated in FIG. 13, optical amplifiers are inserted at both of the preceding stage and the following stage of the optical splitters 404-1 to 404-N but may be inserted at one of the preceding stage and the following stage. In the configuration of the wavelength routing SW in this embodiment, there are two stages at which optical amplifiers can be inserted. This can offer more flexibility in design for the optical amplifier arrangement and the gain allocation. The configuration of this embodiment will be essential if the number of ports increases, thereby increasing the channel loss, and a sufficient gain cannot be obtained by only inserting an optical amplifier at a single position along each channel. Also, since optical amplifiers with a high gain or high optical output are expensive, it is possible to employ a configuration in which optical amplifiers with a lower gain are used at two stages. Also, the optical amplifier arrangement and configuration may be different among the N wavelength group generators. Thus, according to this embodiment, it is possible to select an optimum configuration by considering the performance and cost of the optical amplifiers that vary from one situation to another.

Embodiment 5

With the wavelength routing SWs in the above embodiments 1 to 4, various variations of the configuration of the splitting-selection unit have been discussed. In this embodiment, a variation of the multiplexer in each wavelength group generator will be presented. As mentioned earlier, an AWG which is small in size and relatively small in loss is preferably used as the multiplexer of each wavelength group generator. However, if the number of ports in the optical switch device is to be increased, it will be necessary to increase the number M of wavelengths per wavelength group generator or narrow the wavelength intervals. This will make the designing and fabrication of the AWG difficult. In this embodiment, a specific configuration example of a wavelength group generator using a plurality of AWGs, which reduces this problem, will be discussed.

Figure 14A:
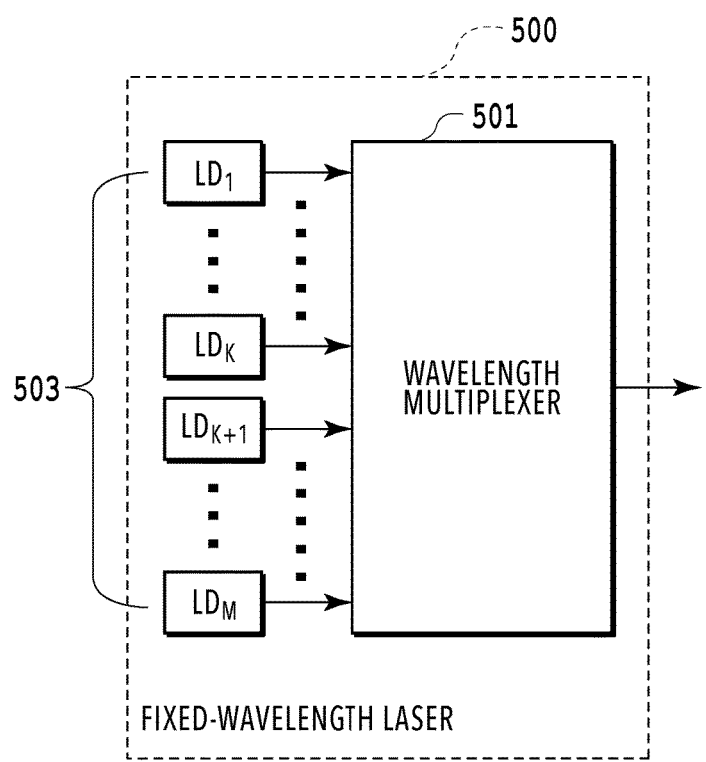
FIG. 14A is a diagram illustrating a configuration example of an AWG in a wavelength group generator in embodiment 5 of the wavelength routing SW in the present disclosure.
Figure 14B:
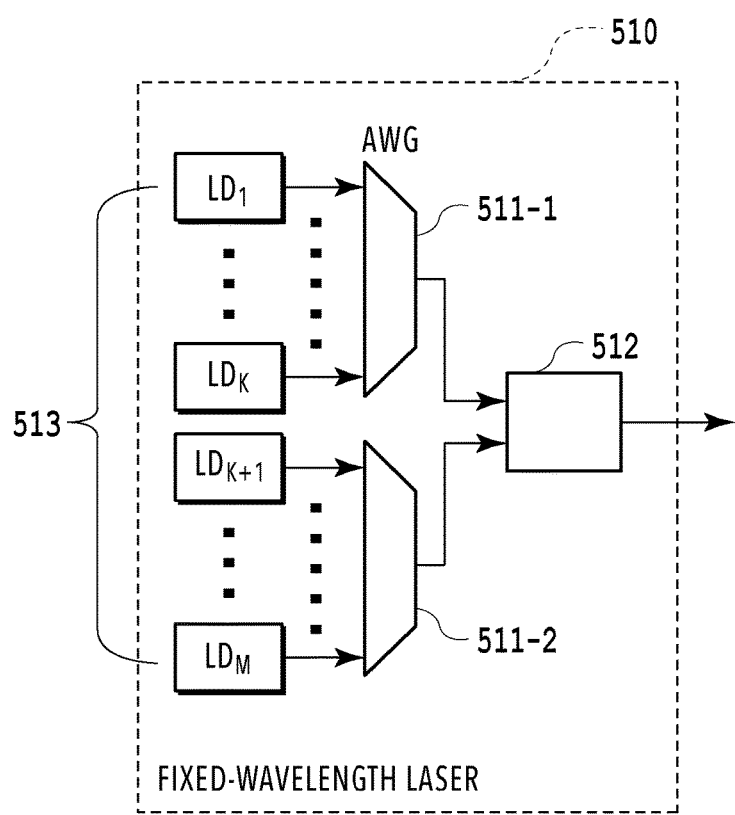
FIG. 14B is a diagram illustrating another configuration example of the AWG in the wavelength group generator in embodiment 5 of the wavelength routing SW in the present disclosure.
Figure 14C:
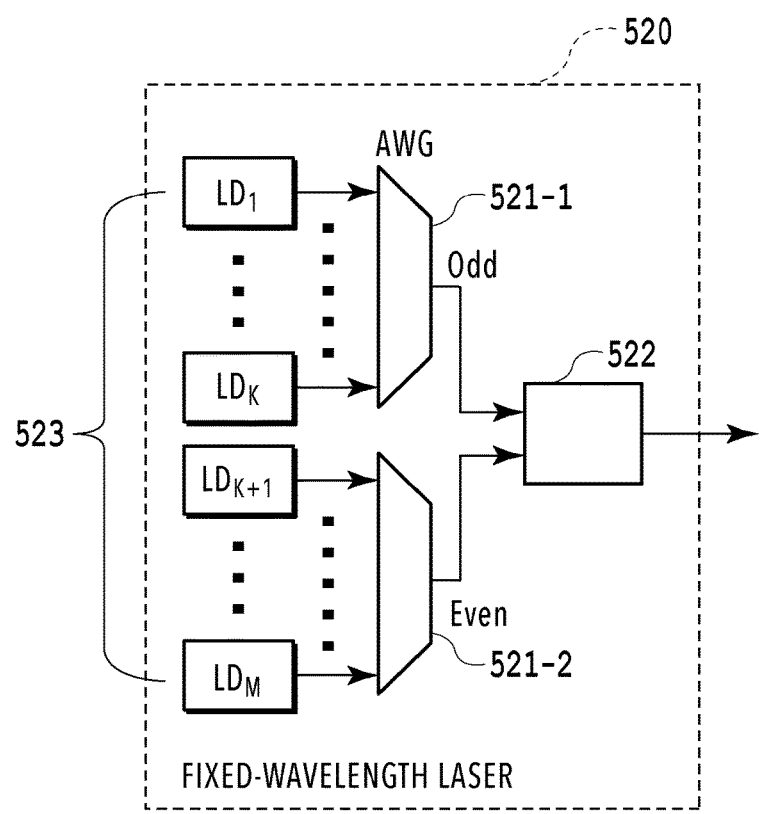
FIG. 14C is a diagram illustrating still another configuration example of the AWG in the wavelength group generator in embodiment 5 of the wavelength routing SW in the present disclosure.

FIG. 14A to FIG. 14C are diagrams illustrating configuration examples of a multiplexer using AWGs in a wavelength group generator of a wavelength routing SW in embodiment 5 of the present disclosure. FIG. 14A illustrates the basic configuration of a wavelength group generator 500 in the wavelength routing SW in the present disclosure. A multiplexer 501 multiplexes modulated light beams from M light sources 503 that generate different wavelengths ($\lambda_1$ to $\lambda_M$) and outputs a multiplexed light beam. Thus, an M×1 AWG can be used as the multiplexer. However, even if one attempts to obtain, for example, an AWG having 100 input ports at 50-GHz intervals or an AWG having 100 to 200 input ports at 25-GHz intervals, it will be difficult to make a design that satisfies characteristic requirements such as the accuracy of the center frequency, the absolute value of the transmission loss, and variations for all channels.

FIG. 14B illustrates configuration example 1 in which the number of ports per AWG is reduced. In configuration example 1, a wavelength group generator 510 includes M fixed-wavelength light sources 513, two AWGs 511-1 and 511-2, and a wavelength combiner 512. In this configuration example, the M fixed-wavelength light sources 513 are divided into two groups, and AWGs with channel configurations corresponding to the wavelength subgroups of these groups are used. Since the number of input ports per AWG can be reduced, AWG design requirements are eased. Multiplexed light beams from the two AWGs 511-1 and 511-2 are combined by the wavelength combiner 512 and supplied as a single multiplexed light beam to the splitting-selection unit at the next stage. Various types of devices such as an optical coupler, a WSS, an MZ interferometer, and an AWG can be used as the wavelength combiner 512.

FIG. 14B illustrates the simplest example in which the M light sources (wavelengths) are divided into two groups. However, the M light sources (wavelengths) may be divided into three or more groups. Also, the number of wavelengths per group may be the same or different.

FIG. 14C illustrates configuration example 2 in which the number of ports per AWG is reduced and the wavelength intervals are widened. In configuration example 2, a wavelength group generator 520 includes M fixed-wavelength light sources 523, two AWGs 521-1 and 521-2, and an interleaver 522. In this configuration example, the M fixed-wavelength light sources 523 are divided into two groups, and AWGs with channel configurations corresponding to the wavelength subgroups of these groups are used. In this configuration example, one of the light source groups is made up of the light sources with the odd wavelength numbers among the wavelength numbers $\lambda_1$ to $\lambda_M$. The other light source group is made up of the light sources with the even wavelength numbers among the wavelength numbers $\lambda_1$ to $\lambda_M$. With each AWG configured as above so that the two AWGs 521-1 and 521-2 can alternately multiplex the successive M wavelengths $\lambda 1$ to $\lambda M$, it is possible to reduce the number of ports per AWG while also doubling the intervals between the wavelengths to be multiplexed (e.g. 50 GHz→100 GHz). The AWG design requirements for both the number of ports and the wavelength intervals are eased. Multiplexed light beams from the two AWGs 521-1 and 521-2 are combined by the interleaver 522 and supplied as a single multiplexed light beam to the splitting-selection unit at the next stage. Various types of devices such as an optical coupler, a WSS, an MZ interferometer, and an AWG can be used as the interleaver 522.

FIG. 14C illustrates the example in which the M light sources (wavelengths) are divided into two wavelength groups with even numbers and odd numbers. However, the M light sources (wavelengths) may be divided into three or more groups. For example, in a case of three groups, each wavelength number may just need be sorted into a group by the remainder of the division of the wavelength number by 3 (0, 1, 2). In a case of n groups, each wavelength number may just need be sorted into a group by the remainder of the division of the wavelength number by n (0, 1, n-1).

According to the above-described configuration examples in this embodiment, the number of light sources (the number M of wavelengths) per wavelength group generator can be increased more easily, and an optical switch device of a large scale over 1000×1000 can be obtained.

Embodiment 6

In the above-described embodiments of the wavelength routing SW in the present disclosure, fixed-wavelength light sources are used as the light sources in each wavelength group generator. Since light sources significantly less expensive than wavelength-tunable light sources as those in the conventional technique can be employed, a low-cost optical switch device suitable also for use with a data center can be obtained. However, if light sources that can tune their wavelengths within a limited narrow range are used as the light sources, it will be possible to further use the multiplexing function and wavelength-dependent output port selecting function further of AWG. In this way, it will be possible to reduce the channel loss in the optical switch device and accordingly ease the necessary requirements for optical amplifiers by, for example, reducing the number of optical amplifiers or lowering the necessary gain.

Figure 15:
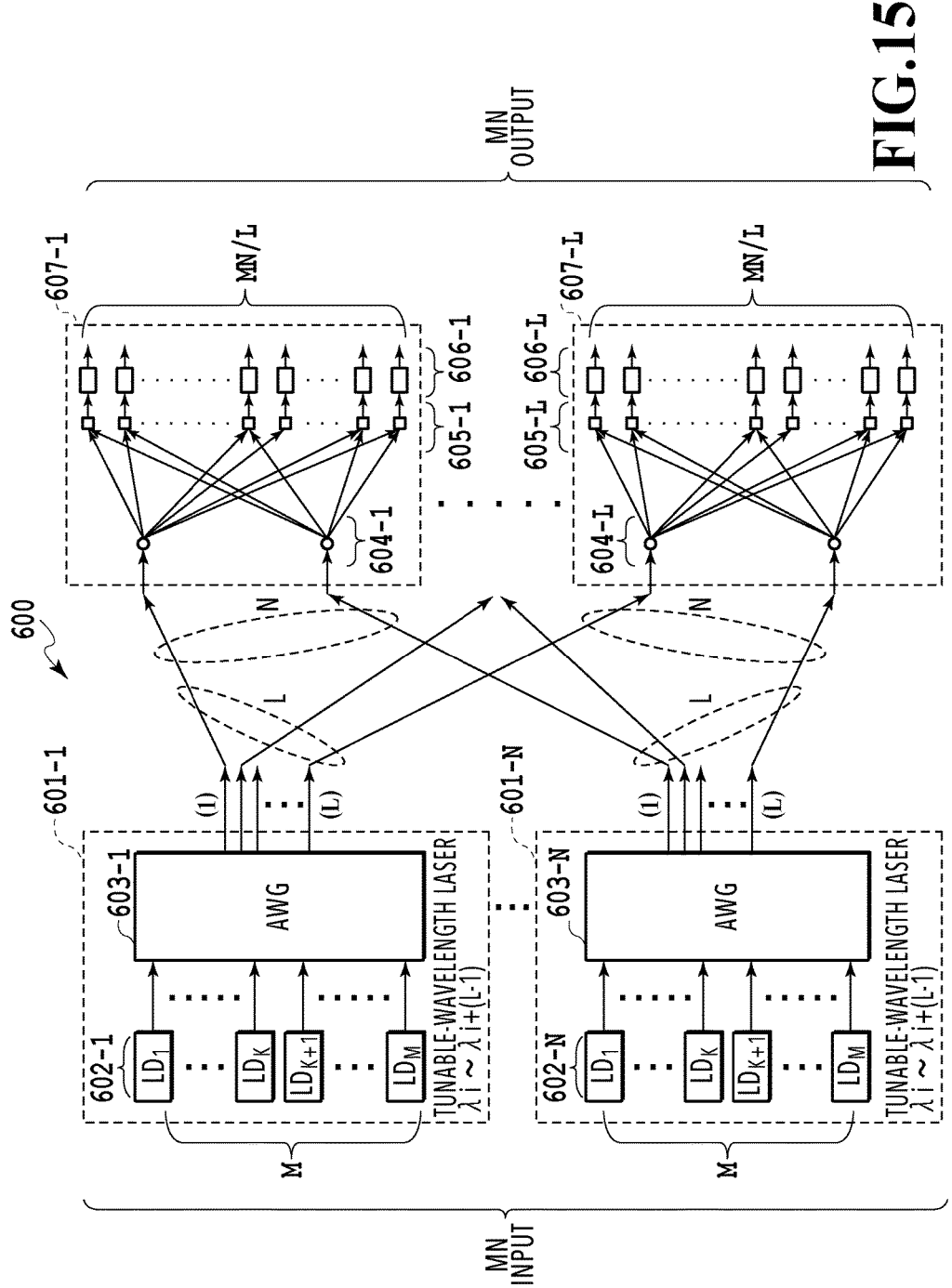
FIG. 15 is a configuration diagram of embodiment 6 of the wavelength routing SW in the present disclosure.

FIG. 15 is a diagram illustrating embodiment 6 of the wavelength routing SW in the present disclosure. A wavelength routing SW (optical switch device) 600 in this embodiment includes N wavelength group generators 601-1 to 601-N and L wavelength routing units 607-1 to 607-L. Each wavelength routing unit is the same as the configuration obtained by combining the splitting-selection unit and the tunable filters (TFs) in embodiment 1. In other words, in this embodiment, L sets of the splitting-selection unit and the tunable filters (TFs) in embodiment 1, which are separated from each other, are configured in parallel. L different multiplexed light beams are output from a single wavelength group generator and supplied to the L wavelength routing units, respectively.

The configuration of the wavelength group generators 601-1 to 601-N is also mostly similar to those in the other embodiments yet differs in the following point. This embodiment uses, as the M light sources in a single wavelength group generator, light sources each of which can tune its wavelength, in addition to a start wavelength among $\lambda_1$ to $\lambda_M$, within a range limited to L successive wavelengths including the start wavelength. Specifically, for the first light source among the M light sources in the wavelength group generator 601-1, the oscillation wavelength of the light source is $\lambda_1$ as a start wavelength and can further be tuned within a range of $\lambda_2, \ldots,$ and $\lambda_L$. Likewise, for the second light source, the oscillation wavelength of the light source is $\lambda_2$ as a start wavelength and can further be tuned within a range of $\lambda_3, \ldots,$ and $\lambda_{L+1}$, and for the third light source, the oscillation wavelength of the light source is $\lambda_3$ as a start wavelength and can further be tuned within a range of $\lambda_4, \ldots,$ and $\lambda_{L+2}$. Thus, for the M-th light source, the oscillation wavelength of the light source is $\lambda_M$ as a start wavelength and can further be tuned within a range of $\lambda_{M+1}, \ldots,$ and $\lambda_{L-M-1}$. In short, a single light source handles a single wavelength group, and a single wavelength group includes L types of wavelengths. A different light source can be allocated with, but not limited to, a different wavelength group.

More specifically, in the conventional technique, when the maximum number of light sources per wavelength group generator is M=100, each light source requires a wavelength tuning function to output 100 different types of wavelengths. In contrast, in this embodiment, with L=10, each light source may only need a wavelength tuning function to output 10 types of adjacent wavelengths including a start wavelength. Hence, the wavelength tuning range only needs to be ⅒ of the conventional technique. Achieving performance that allows stable tuning of the light source wavelength across a wide range is directly linked to difficulty in cost and design of a wavelength-tunable light source. If the wavelength tuning range is as narrow as ⅒, it is possible to greatly simplify the wavelength control mechanism for the laser light sources. As mentioned earlier, in this embodiment too, the number of wavelength-tunable LDs in each of the N wavelength group generators is at most M, and the number of wavelength-tunable LDs may be smaller than M in all or some of the wavelength group generators. Also, the number of light sources may be different from one wavelength group generator to another.

The wavelength routing SW in this embodiment uses wavelength-tunable light sources within a limited narrow wavelength range. At the same time, L output ports of an AWG 603-1 serving as the multiplexer of the wavelength group generator 601-1 are used. The wavelength of a light beam to be input from a light source into one of the input ports of the AWG is tunable within a narrow range (e.g. L=10). In this way, it is possible to select one of the AWG output ports 1 to L to which to output the modulated light beam from that light source. Referring again to the example of the multiplexing operation of the non-cyclic AWG illustrated in FIG. 8B, the start wavelengths of all light sources correspond to the wavelength group 83, and multiplexed and output to the output port 1. On the other hand, it will be understood that the state where the wavelength numbers are changed by one from the respective start wavelengths corresponds to the wavelength group 84, and the wavelengths are multiplexed and output to the output port 2. Thus, with the multiplexing function and input wavelength-dependent output port selecting function of AWG, one of the above-mentioned L wavelength routing units 607-1 to 607-L can be selected as the output destination for a multiplexed light beam containing modulated light beams from the target light sources.

Non-cyclic AWGS and cyclic AWGs both have the above-mentioned wavelength multiplexing function and input wavelength-dependent output port selecting function of AWG. In the configuration of this embodiment, both a non-cyclic AWG and a cyclic AWG are usable. With a non-cyclic AWG with M=100 and L=10 for example, a single wavelength group generator needs to output wavelengths within a range of $\lambda_1$ to $\lambda_{110}$ as a whole. However, from the perspective of each individual wavelength-tunable light source, the wavelength tuning range of each single light source is very narrow (only 10 types of wavelengths with L=10). Hurdles for the complexity and cost of having wavelength-tunable light sources are rather lower for the configuration of this embodiment than for the conventional technique. Obtaining light sources that tune their wavelengths within a limited narrow range as in this embodiment is rather easier than the conventional technique, in which all light sources require the ability to tune their wavelengths within the full wavelength range of $\lambda_1$ to $\lambda_{100}$. In the case of using a cyclic AWG, practically the same number of start wavelengths as the other embodiments, or $\lambda_1$ to $\lambda_{100}$, can be obtained with a single wavelength group generator as a whole by appropriately setting the number M of light sources and the number of ports of the cyclic AWG, i.e. the number L of wavelengths among which a single light source can tune its wavelength.

Figure 16:
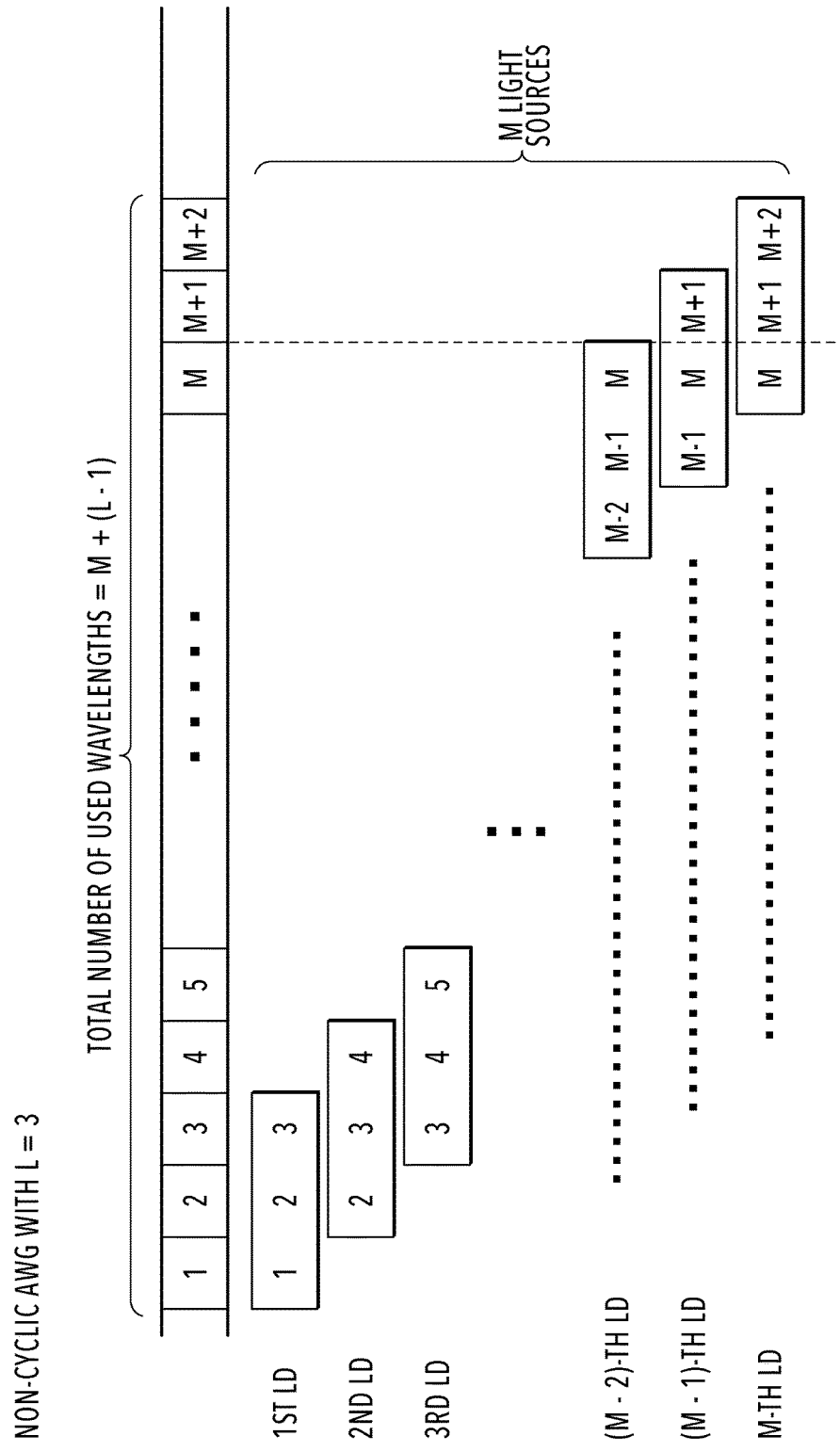
FIG. 16 is a diagram schematically illustrating the wavelengths used by each light source in a case where non-cyclic AWGs are employed in embodiment 6.

FIG. 16 is a diagram schematically illustrating the wavelengths to be used by each light source in a case of using a non-cyclic AWG in embodiment 6. Illustrated is a case where the number of light sources (LDs) in a single wavelength group generator is M and, for simplicity, L=3. The numbers of the wavelengths to be used by each LD are presented in a rectangle. Wavelength numbers 1, 2, and 3 are used by the first LD, and wavelength numbers, 2, 3, and 4 are used by the second LD. The same applies to the rest, and wavelength numbers M, M+1, and M+2 are used by the M-th LD. The first wavelength in the rectangle corresponds to the start wavelength.

Figure 17:
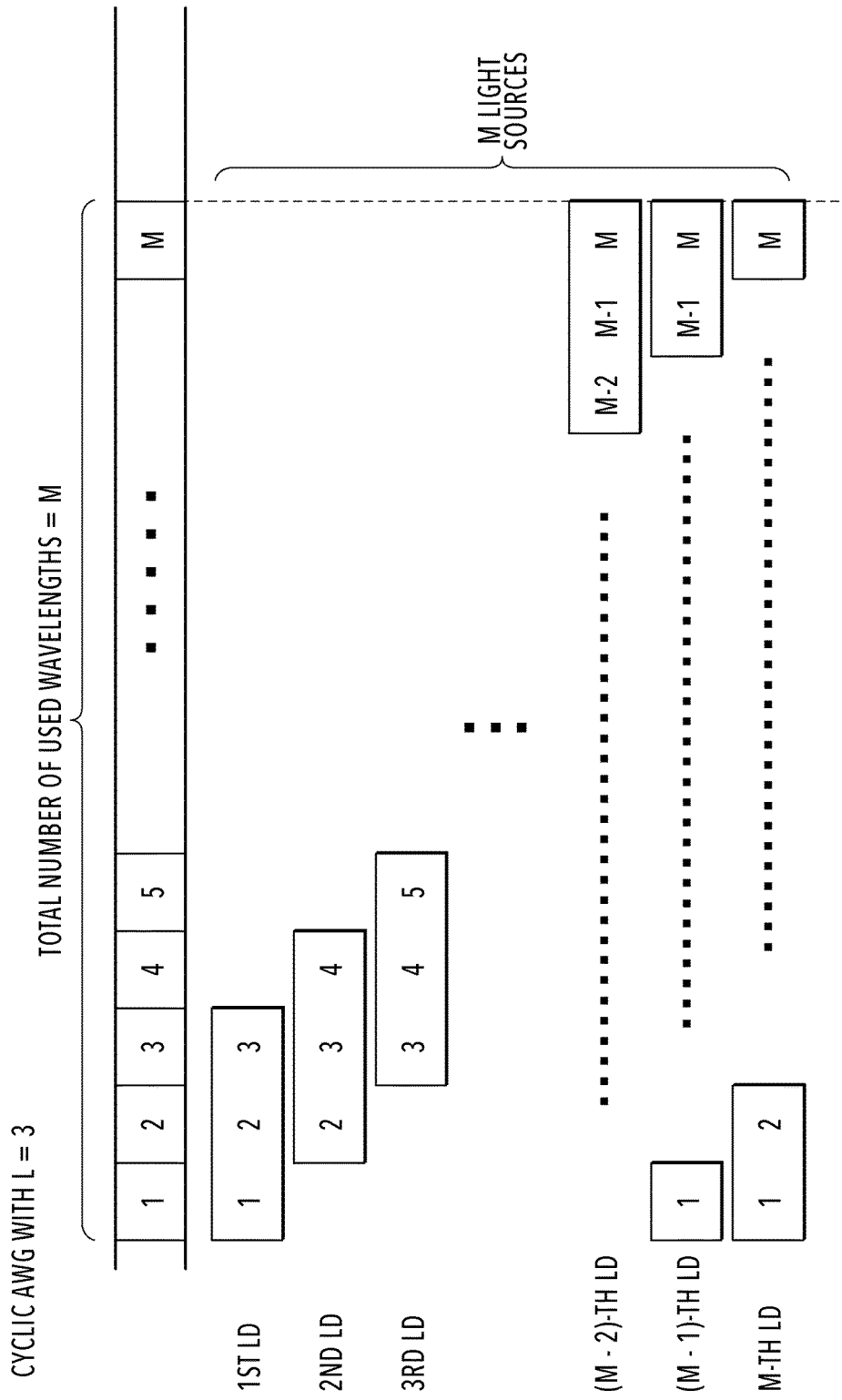
FIG. 17 is a diagram schematically illustrating the wavelengths used by each light source in a case where cyclic AWGs are employed in embodiment 6.

FIG. 17 is a diagram schematically illustrating the wavelengths to be used by each light source in a case of using a cyclic AWG in embodiment 6. As in FIG. 16, illustrated is a case where the number of light sources in a wavelength group generator is M and L=3, and the numbers of the wavelengths to be used by each LD are presented in a rectangle. The difference from the non-cyclic AWG is that when the start wavelength is close to the M-th position, the used wavelength range includes a cyclically adjacent wavelengths. Specifically, wavelength numbers M−1, M, and 1 are used by the (M−1)-th LD, and wavelength numbers M, 1, and 2 are used by the M-th LD. The M-th wavelength and the first wavelength are physically far from each other but are cyclically adjacent to each other in the cyclic AWG. By using the cyclic AWG, the total number of wavelengths to be used in a wavelength group generator can just be M.

Each of the wavelength routing units 607-1 to 607-L is the same as the configuration of the splitting-selection unit and the tunable filters (TFs) in embodiment 1. More specifically, the wavelength splitting-selection unit in the wavelength routing unit 607-1 has N inputs to which corresponding N output ports among the sets of L output ports of the N wavelength group generators 601-1 to 601-N are connected and to which multiplexed light beams are input from these corresponding N output ports. The wavelength splitting-selection unit in the wavelength routing unit 607-1 includes: N optical splitters or wavelength selective switches 604-1 each of which splits the multiplexed light beam from the corresponding one of the N wavelength group generators, which are connected to these N inputs respectively, into MN/L light beams; and MN/L N×1 optical switches 605-1 each of which selects the split light beam corresponding to one wavelength group generator among the N wavelength group generators from among the split light beams from the N optical splitters or wavelength selective switches.

In this section, the value of MN/L is assumed to be a natural number for simplicity. Thus, FIG. 15 illustrates a configuration in which the number of input ports and the number of output ports in the output switch device are both MN and there is no unused port among the output ports of the wavelength routing units 607-1 to 607-L. A configuration as a more generalized version of this embodiment in which the value of MN/L is a non-natural number and the optical switch device tolerates the presence of an unused output port will be described in later-described embodiment 9.

In the wavelength routing SW in this embodiment, illustrated in FIG. 15, even when the wavelengths set for two light sources in a single wavelength group generator are the same, the output port for the multiplexed light beam multiplexed to contain the modulated light beams from the light sources will also be different if the AWG input ports to which the light sources are connected are different, and a different wavelength routing unit will be selected among the L wavelength routing units 607-1 to 607-L. Thus, by selecting any wavelength for each individual light source in each single wavelength group generator within a range of L successive wavelengths starting from its start wavelength, one of the L output ports of the AWG is selected, and further the corresponding MN output ports are selected. In other words, an exceptional feature of this embodiment is that the output port selecting function of the AWG in each wavelength group generator serves also part of the optical splitting function of the splitting-selection units in the other embodiments.

With an optical coupler used as an optical coupler, the loss increases in accordance with the number of splits such that the loss is 3 dB with 2 splits, 6 dB with 4 splits, and 10 dB with 10 splits. On the other hand, the loss between the input and output ports of the AWG in this embodiment, which executes the output port selecting function, is about 3 to 5 dB. Thus, using the output port selecting function can reduce the loss of each channel in the optical switch device as a whole. The amount of reduction in loss compared with the loss by an optical coupler increases as the number of AWG output ports increases. Accordingly, it is possible to reduce the number of optical amplifiers or ease performance requirements such as the gain of the optical amplifiers and the maximum optical output level. It is therefore possible to further reduce the size and cost of the optical switch device.

It is needless to say that features of the foregoing embodiments can be combined with the configuration of this embodiment. For example, the multi-stage configuration of each optical splitter in embodiment 2 can be combined with the configuration of this embodiment. Further, optical amplifiers can be combined as in embodiment 3 and embodiment 4. Furthermore, a plurality of AWGs can also be used in each wavelength group generator as in embodiment 5.

Embodiment 7

Figure 18A:
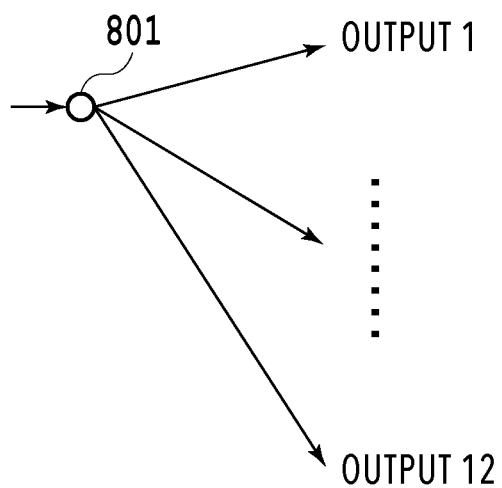
FIG. 18A is a diagram explaining a configuration of an optical splitter or wavelength selective switch in the wavelength routing SW in the present disclosure.
Figure 18B:
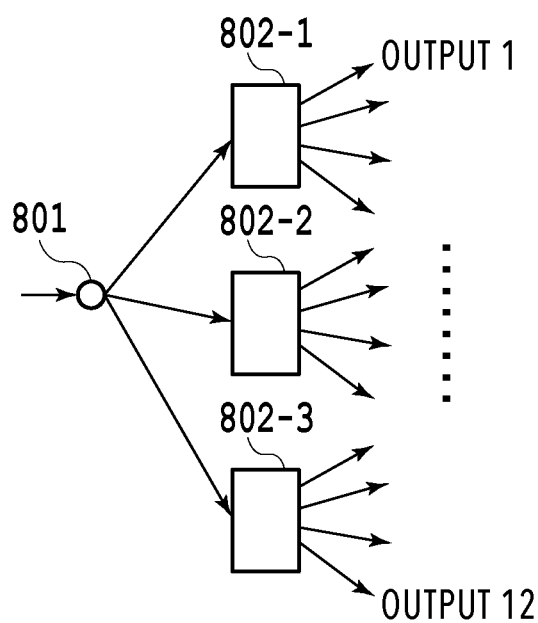
FIG. 18B is a diagram explaining another configuration of the optical splitter or wavelength selective switch in the wavelength routing SW in the present disclosure.
Figure 18C:
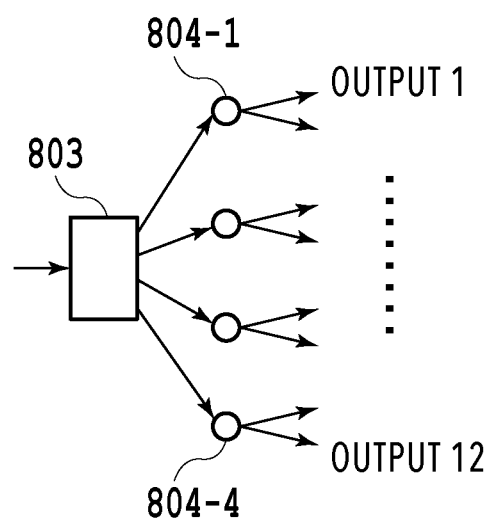
FIG. 18C is a diagram explaining still another configuration of the optical splitter or wavelength selective switch in the wavelength routing SW in the present disclosure.

FIG. 18A to FIG. 18C are diagrams explaining configurations of an optical splitter or wavelength selective switch in a wavelength routing SW in embodiment 7 of the present disclosure. They are diagrams illustrating other configuration examples of the optical splitters or wavelength selective switches in the above embodiments 1 to 6. FIG. 18A illustrates a case where an optical splitter or wavelength selective switch which splits a multiplexed light beam from a wavelength group generator (104-1 to 104-N, 204-1 to 204-N, 304-1 to 304-N, 404-1 to 404-N) is configured using an optical splitter, as discussed in the above embodiments. For example, an optical coupler 801 can be used as the optical splitter. An optical coupler with a 12-split configuration is exemplarily illustrated.

FIG. 18B illustrates a configuration example in which a 3-split optical coupler 801 and WSSs 802-1 to 802-3 with a 1×4 configuration are combined and cascaded to obtain the equal number of splits, or 12 splits. A WSS with a 1×4 configuration can output a multiplexed light beam to any ports among its four outputs with any wavelength combination. Thus, a WSS has not only a simple splitting function but also wavelength selectivity and has the function of the wavelength selection filters (TFs) at the last stage in each embodiment of the present disclosure. As already mentioned, in the wavelength routing SWs, optical signals with wavelengths that are not selected by a target TF at the last stage corresponding to a desired output port do not need to be split and supplied to the target TF in the first place. Hence, as long as TFs are provided at the last stage, it is not necessary to use the wavelength selectivity of any WSS. Nonetheless, by combining an optical splitter and WSSs and using the wavelength selectivity of the WSSs, a channel from a wavelength group generator including a selected input port to a target TF can be formed to cause a lower loss.

By applying the configuration of FIG. 18B to embodiment 1 and embodiment 3 for the optical splitters or wavelength selective switches, the wavelength selecting function of the TFs are the last stage can be implemented with the WSSs instead, and the TFs can therefore be omitted. However, WSSs are generally more expensive than optical couplers. Also, the number of output ports that can be provided is about 20 at most, so that the configuration is limited up to 1×20. The configuration of FIG. 18B, which increases the number of WSSs, is not suitable when the scale of the target optical switch device is a very large scale such as 1000× 1000. As already mentioned, for example, a loss of 13 dB occurs with a 20-split optical coupler. However, the loss is only 7 dB with a 1×20 WSS. Thus, it is effective to combine an optical splitter and WSSs to reduce the channel loss in the whole optical switch device.

FIG. 18C illustrates a configuration example in which a WSS 803 with a 1×4 configuration and 4 3-split optical couplers 804-1 to 804-4 are combined and cascaded to obtain 12 splits, or the equal number of splits to the optical coupler 801 in FIG. 18A. The configuration in FIG. 18C is a configuration obtained by switching the order of the cascade connection in FIG. 18B in the front-rear direction. The equal number of splits, or 12 splits, can be obtained with a lower loss than when the optical coupler 801 is used alone as in the configuration in FIG. 18A. Also, the number of WSSs, which are expensive, can be smaller than the configuration in FIG. 18B. In the case of placing the optical couplers 804-1 to 804-4 at the rear stage as in the configuration in FIG. 18C, the TFs at the last stage cannot be omitted. Nonetheless, as in the configuration in FIG. 18B, the combination of an optical splitter and WSSs can reduce the channel loss in the whole optical switch device.

It is needless to say that a configuration with an optical splitter-WSS combination as in the above FIG. 18B and FIG. 18C is also applicable to the optical splitters or wavelength selective switches 207 and 407 in the DC switches in embodiment 2 and embodiment 4. With an optical splitter-WSS combination as in this embodiment, it is possible to further reduce the channel loss in the optical switch device and simplify the configuration and specification of optical amplifiers.

Embodiment 8

Figure 19:
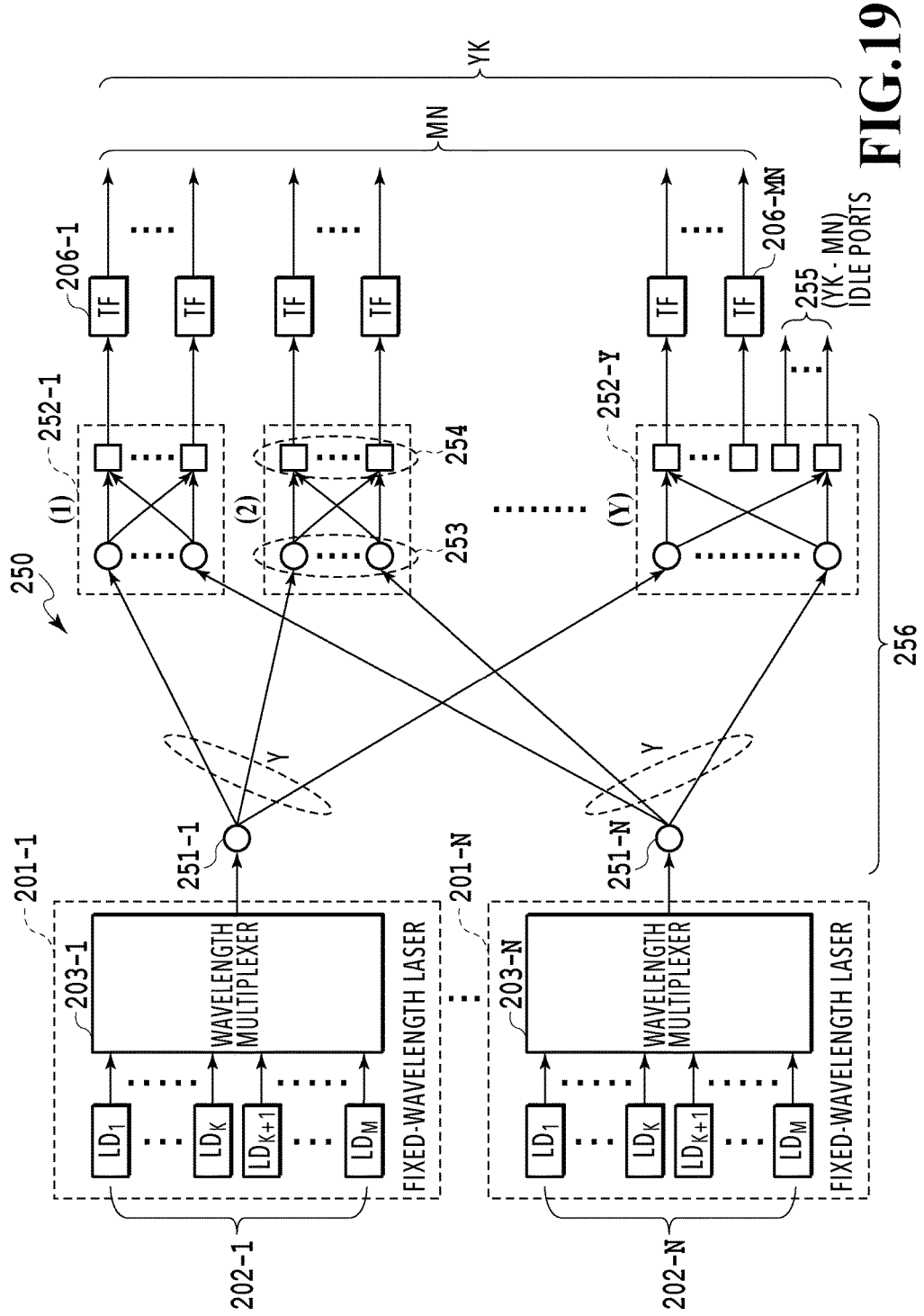
FIG. 19 is a configuration diagram of embodiment 8 of the wavelength routing SW in the present disclosure.

FIG. 19 is a diagram illustrating of a wavelength routing SW in embodiment 8 of the present disclosure and illustrating a configuration example of the wavelength routing SW as a more generalized version of the configuration of the wavelength routing SW in embodiment 2, illustrated in FIG. 11. In the configuration of embodiment 2 in FIG. 11, the number K of splits at the optical splitters or wavelength selective switches 204-1 to 204-N is limited to such a number that MN/K is a natural number. This is because it is impossible to make DC switches if MN/K is a non-natural number. Owing to this limitation, in the configuration of embodiment 2 in FIG. 11, there is no unused, remaining port among the output ports of the DC switches 205-1 to 205-K, so that the output ports are used without waste. The configuration of this embodiment in FIG. 19 differs from embodiment 2 in that the number Y of light beams into which to split a multiplexed light beam at optical splitters or wavelength selective switches 251-1 to 251-N in a splitting-selection unit 256 is the smallest natural number Y satisfying MN/K≤Y. More specifically, Y delivery and coupling (DC) switches 252-1 to 252-Y are provided, and each DC switch includes N 1×K optical splitters or wavelength selective switches 253 each of which selects a multiplexed light beam from one wavelength group generator among the N wavelength group generators 201-1 to 201-N, and K N×1 optical switches 254 each of which is connected to outputs from the N optical splitters or wavelength selective switches 253.

Also, in this embodiment, the total number of output ports of the Y DC switches 252-1 to 252-Y is KY and is larger than the number MN, which the optical switch device needs for the wavelength routing, i.e. the necessary number of tunable filters (TFs). Thus, as in FIG. 19, for example, (YK-MN) output ports at the last, Y-th DC switch 252-Y need no TF and therefore are unused ports 255. Here, the positions of the unused ports do not need to be concentrated only at the Y-th DC switch 252-Y but may be the positions of any output ports of the Y DC switches 252-1 to 252-Y. This embodiment differs from embodiment 2 only in that the limitation on the choice of the number Y of splits at the optical splitters or wavelength selective switches 251-1 to 251-N is eased in relation to the value of MN, which in turn results in remaining ports. Thus, since there is no limitation on this number Y of splits, this embodiment is a more generalized version of the configuration of the wavelength routing SW in embodiment 2.

Here, the following is a more specific example of the numerical values. Assume that the number of wavelength group generators is N=2, the number of light sources in a wavelength group generator is M=100, and K is 6. In this case, 100×2/6=33.33, and therefore the smallest Y satisfying MN/K≤Y is 34. The splitting-selection unit may just need to include 2 optical splitters (or wavelength selective switches) with a 1×34 configuration and 34 DC switches with a 2×6 configuration. Each DC switch includes two optical splitters (or wavelength selective switches) with a 1×6 configuration and six optical switches with a 2×1 configuration. Each DC switch has six output ports. Then, with all 34 DC switches, there are YK, i.e. 34×6=204 output ports. Here, MN, i.e. 100×2=200 is enough as the number of output ports necessary for the wavelength routing SW. Then, among all 204 output ports of the 34 DC switches, 4 output ports will be left unused. The positions of the unused ports may be four positions at the 34-th DC switch. However, the positions do not have to be concentrated and gathered at one spot but may be the positions of any four of the output ports of the 34 DC switches.

Embodiment 9

In the wavelength routing SW in embodiment 6, explained in FIG. 15, the number L of output ports of the AWG in a wavelength group generator is limited to such a number that MN/L is a natural number. This is because it is impossible to make optical splitters or wavelength selective swiches in each wavelength routing unit if MN/L is a non-natural number. Owing to this limitation, in embodiment 6, there is no remaining, unused output port among the output ports of the wavelength routing units 607-1 to 607-L, so that the output ports are used without waste in the optical switch device as a whole. However, as in the relation between embodiment 2 and embodiment 8, if the presence of any unused output ports in the optical switch device is tolerated, cases where the value of MN/L is a non-natural number will be covered as well. Accordingly, the configuration of embodiment 6 can be more generalized. The configuration of this embodiment as a generalized version of embodiment 6 differs from embodiment 6 only in that no TF is connected in some of the L wavelength routing units 607-1 to 607-L or not all of the configurations of the L wavelength routing units 607-1 to 607-L are the same. The basic configuration is the same as FIG. 15.

In this embodiment, when the value of MN/L is not a natural number, the smallest natural number K satisfying MN/L≤K is newly introduced. In the splitting-selection units in the wavelength routing units, the configuration of the optical splitters or wavelength selective switches 604-1 to 604-L and the number of optical switches 605-1 to 605-L are each defined by K instead of MN/L. Thus, the relation of connection between the elements in each wavelength routing unit remains unchanged from that in embodiment 6. However, since split channels are not necessary for unused ports, the number of split channels in some of the wavelength routing units can be reduced. Thus, all of the configurations of the L wavelength routing units do not need to be the same. The configuration of each wavelength routing unit including any unused port can be simplified in accordance with the number of unused ports by making the number of split channels therein smaller than that of the other wavelength routing units including no unused port.

FIG. 20 is a table of comparison in configuration parameters between the optical switch device in embodiment 6, in which the value of MN/L is a natural number, and the optical switch device in this embodiment, in which the value of MN/L is a non-natural number. FIG. 20 also describes specific configuration examples (example 1 to example 6) with different combinations of the values of M, N, and L. When all of the configurations of the wavelength routing units 607-1 to 607-L in this embodiment are the same, the total number of output ports of the wavelength routing units 607-1 to 607-L is KL and is larger than the maximum number MN of ports of the optical switch device, as can be easily understood from the comparison between embodiment 2 and embodiment 8. To give a specific example, in example 6 in FIG. 20, MN=82×8=656 and KL=94×7=658, so that there are two unused ports among all wavelength routing units. Thus, the configuration can be such that, for example, only the optical splitters or wavelength selective switches 604-L of the L-th wavelength routing unit 607-L have a smaller number of splits.

However, considering the fact that modularized configurations are used, the fabrication processes, and so on, fabricating wavelength routing units with different configurations in a single wavelength routing device actually increases complexity in management. For this reason, it is more reasonable to make the configurations of all wavelength routing units 607-1 to 607-L the same. The table in FIG. 20 illustrates specific configuration examples under the assumption that the configurations of all wavelength routing units are the same, as illustrated in FIG. 15 in this embodiment, and unused output ports are present. The total number of output ports of the wavelength routing units 607-1 to 607-L is KL but, as a matter of course, only MN TFs, which are necessary for the optical switch device, may just need to be provided at the last stage. Also, in the optical switch device in this embodiment, the positions of the unused output ports do not need to be in the L-th wavelength routing unit 607-L but may be any positions among the output ports of the L wavelength routing units.

Thus, even in a case where the number of unused output ports is very large, if at least one of the wavelength routing unit configurations exemplarily illustrated in the table in FIG. 20 is included, it is included as a configuration of this embodiment. However, a configuration of M, N, and L with a large number of unused output ports is very wasteful and, in the first place, represents a design in which inappropriate parameters are selected. Thus, it is reasonable to make a configuration with as few unused output ports as possible, as a matter of course.

As a modification of embodiment 8, the optical switch device in the present disclosure can be implemented as an optical switch device comprising: N M-input L-output multiplexers (603-1 to 603-N) each of which multiplexes light beams with at most M (M is a natural number larger than or equal to 2) different wavelengths and outputs a multiplexed light beam, each of the light beams with the at most M different wavelengths being a light beam with one wavelength selected from different wavelength groups each including L (a natural number satisfying M>L) types of wavelengths; L N-input wavelength splitting-selection units to each of which corresponding N output ports among sets of L output ports of the N multiplexers are connected and the multiplexed light beams are input from the corresponding N output ports, at least one of the N-input wavelength splitting-selection units including N optical splitters which are respectively connected to the N inputs and each split the multiplexed light beam from a corresponding one of the N multiplexers into K light beams, and K N×1 optical switches each of which selects, from among the split light beams from the N optical splitters, a split light beam corresponding to one multiplexer among the N multiplexers, where K is a smallest natural number satisfying MN/L≤K; and MN/L tunable filters (606-1 to 606-L) each of which selects a light beam with any one wavelength from among the light beams with the different wavelengths multiplexed by the one multiplexer selected by a corresponding one of the K N×1 optical switches. Also, the above optical switch device can further comprise at most M light sources each of which generates a light beam with one wavelength among light beams with the at most M different wavelengths, includes a means for modulating the light beam with an electrical signal, and outputs the modulated light beam with the one wavelength, and the at most M light sources and a corresponding one of the multiplexers can constitute a wavelength group generator.

In all the embodiments discussed thus far, only the constituent elements that constitute the channels in the optical switch devices have been described. However, the wavelength routing SWs include control units for the elements not illustrated in the drawings. For example, when switching the channels in the optical switch device, a control unit controls the elements in order to set the wavelengths of the light sources in each wavelength group generator, set the tuned wavelengths of the tunable filters, and set the selected wavelengths of the wavelength selective switches. The configuration of the control unit is not limited at all; a single control unit may control the entire operation of the whole wavelength routing SW, or distributed control units may control it. Each control unit includes a CPU, a memory, and so on, but its configuration is not limited either.

As discussed above in detail, the wavelength routing SW in the present disclosure can employ light sources that cost significantly less than those in the conventional technique by using fixed-wavelength light sources and tunable filters. Also, the wavelength routing SW in the present disclosure can reduce the channel loss in the wavelength routing SW while using light sources that costs low next to fixed-wavelength light sources by combining light sources with a limited narrow range of tunable wavelengths and the input wavelength-dependent output port selecting function of an AWG Also, the optical switch device (wavelength routing SW) in the present disclosure is preferably usable in a data center and the like and can contribute to significant reduction of the power consumption at the data center.

INDUSTRIAL APPLICABILITY

The present disclosure is usable as an optical signal processing device. In particular, the present disclosure is usable as an optical switch device that switches optical signal channels.

The invention claimed is:

1. An optical switch device comprising:
N (N is a natural number larger than or equal to 2) multiplexers each of which multiplexes light beams with at most M (M is a natural number larger than or equal to 2) different wavelengths and outputs a multiplexed light beam;
N optical splitters each of which splits the multiplexed light beam from a corresponding one of the N multiplexers into MN split light beams;
MN N×1 optical switches each of which selects, from among the split light beams from the N optical splitters, a split light beam corresponding to one multiplexer among the N multiplexers; and
MN tunable filters each of which selects a light beam with any one wavelength from among the light beams with the at most M different wavelengths multiplexed by the one multiplexer selected by a corresponding one of the MN N×1 optical switches,
wherein the N optical splitters are each configured by combining an optical splitter and a plurality of wavelength selective switches or a wavelength selective switch and a plurality of optical splitters.

2. The optical switch device according to claim 1, wherein the optical switch device further comprises at most M light sources each of which generates a light beam with one wavelength among light beams with the at most M different wavelengths, includes a means for modulating the light beam with an electrical signal, and outputs the modulated light beam with the one wavelength,
the at most M light sources and a corresponding one of the N multiplexers constitute a wavelength group generator, and
the MN tunable filters each select a modulated light beam with any one wavelength.

3. The optical switch device according to claim 1, wherein the optical switch device further comprises one or more optical amplifiers at least one of a preceding stage and a following stage of each of the N optical splitters.

4. The optical switch device according to claim 1, wherein each of the multiplexers includes
a plurality of arrayed waveguide gratings (AWGs), and
one of an optical combiner, an interleaver, and a wavelength selective switch which further combine multiplexed light beams from the plurality of AWGs.

5. The optical switch device according to claim 1, wherein the optical switch device functions as a wavelength routing switch in which
MN modulation means of a plurality of light sources connected to the N multiplexers correspond to input ports of an optical circuit switching switch, and
MN outputs of the tunable filters correspond to output ports of the optical circuit switching switch.

6. An optical switch device comprising:
N (N is a natural number larger than or equal to 2) multiplexers each of which multiplexes light beams with at most M (M is a natural number larger than or equal to 2) different wavelengths and outputs a multiplexed light beam;
N optical splitters each of which splits the multiplexed light beam from a corresponding one of the N multiplexers into K split light beams, where K is such a natural number that MN/K is a natural number;
K N×(MN/K) delivery and coupling (DC) switches each of which selects, from among the split light beams from the N optical splitters, a split light beam corresponding to one multiplexer among the N multiplexers, the DC switches each including N 1×(MN/K) optical splitters to which outputs from the N optical splitters are connected, and (MN/K) N×1 optical switches which are connected to output ports of each of the N 1×(MN/K) optical splitters; and
MN tunable filters each of which selects a light beam with any one wavelength from among the light beams with the at most M different wavelengths multiplexed by the one multiplexer selected by a corresponding one of the N×1 optical switches.

7. The optical switch device according to claim 6, wherein the optical switch device further comprises at most M light sources each of which generates a light beam with one wavelength among light beams with the at most M different wavelengths, includes a means for modulating the light beam with an electrical signal, and outputs the modulated light beam with the one wavelength,
the at most M light sources and a corresponding one of the N multiplexers constitute a wavelength group generator, and
the MN tunable filters each select a modulated light beam with any one wavelength.

8. The optical switch device according to claim 6, wherein at least either the N optical splitters or the optical splitters in the DC switches are each configured by combining an optical splitter and a wavelength selective switch.

9. The optical switch device according to claim 6, wherein the K N×(MN/K) DC switches are M N×N DC switches.

10. The optical switch device according to claim 6, wherein the optical switch device further comprises one or more optical amplifiers at least one of a preceding stage and a following stage of each of the N optical splitters.

11. The optical switch device according to claim 6, wherein each of the multiplexers includes
a plurality of arrayed waveguide gratings (AWGs), and
one of an optical combiner, an interleaver, and a wavelength selective switch which further combine multiplexed light beams from the plurality of AWGs.

12. The optical switch device according to claim 6, wherein the optical switch device functions as a wavelength routing switch in which MN modulation means of a plurality of light sources connected to the N multiplexers correspond to input ports of an optical circuit switching switch, and MN outputs of the tunable filters correspond to output ports of the optical circuit switching switch.

13. An optical switch device comprising:

N (N is a natural number larger than or equal to 2) multiplexers each of which multiplexes light beams with at most M (M is a natural number larger than or equal to 2) different wavelengths and outputs a multiplexed light beam;

N optical splitters each of which splits the multiplexed light beam from a corresponding one of the N multiplexers into Y split light beams, where Y is a smallest natural number satisfying MN/K Y, and K is such a natural number that MN/K is a natural number;

Y N×K delivery and coupling (DC) switches each of which selects, from among the split light beams from the N optical splitters, a split light beam corresponding to one multiplexer among the N multiplexers, the DC switches each including N 1×K optical splitters to which outputs from the N optical splitters are connected, and K N×1 optical switches which are connected to output ports of each of the N 1×K optical splitters; and MN tunable filters each of which selects a light beam with any one wavelength from among the light beams with the at most M different wavelengths multiplexed by the one multiplexer selected by a corresponding one of the N×1 optical switches.

14. The optical switch device according to claim 13, wherein the optical switch device further comprises at most M light sources each of which generates a light beam with one wavelength among light beams with the at most M different wavelengths, includes a means for modulating the light beam with an electrical signal, and outputs the modulated light beam with the one wavelength, the at most M light sources and a corresponding one of the N multiplexers constitute a wavelength group generator, and the MN tunable filters each select a modulated light beam with any one wavelength.

15. The optical switch device according to claim 13, wherein at least either the N optical splitters or the optical splitters in the DC switches are each configured by combining an optical splitter and a wavelength selective switch.

16. The optical switch device according to claim 13, wherein the optical switch device further comprises one or more optical amplifiers at least one of a preceding stage and a following stage of each of the N optical splitters.

17. The optical switch device according to claim 13, wherein each of the multiplexers includes a plurality of arrayed waveguide gratings (AWGs), and one of an optical combiner, an interleaver, and a wavelength selective switch which further combine multiplexed light beams from the plurality of AWGs.

18. The optical switch device according to claim 13, wherein the optical switch device functions as a wavelength routing switch in which MN modulation means of a plurality of light sources connected to the N multiplexers correspond to input ports of an optical circuit switching switch, and MN outputs of the tunable filters correspond to output ports of the optical circuit switching switch.

19. An optical switch device comprising:

N (N is a natural number larger than or equal to 2) M-input L-output multiplexers each of which multiplexes light beams with at most M (M is a natural number larger than or equal to 2) different wavelengths and outputs a multiplexed light beam, each of the light beams with the at most M different wavelengths is a light beam with one wavelength selected from different wavelength groups each including L (L is a natural number satisfying M≥L) types of wavelengths, MN/L is a natural number;

L N-input wavelength splitting-selection units to each of which corresponding N output ports among sets of L output ports of the N multiplexers are connected and the multiplexed light beams are input from the corresponding N output ports, the N-input wavelength splitting-selection units each including:

N optical splitters which are respectively connected to the N inputs of the wavelength splitting-selection unit and each split the multiplexed light beam from a corresponding one of the N multiplexers into MN/L split light beams, and MN/L N×1 optical switches each of which selects, from among the split light beams from the N optical splitters, a split light beam corresponding to one multiplexer among the N multiplexers; and MN/L tunable filters each of which selects a light beam with any one wavelength from among the light beams with the different wavelengths multiplexed by the one multiplexer selected by a corresponding one of the MN/L N×1 optical switches.

20. The optical switch device according to claim 19, wherein the optical switch device further comprises at most M light sources each of which generates a light beam with one wavelength among light beams with the at most M different wavelengths, includes a means for modulating the light beam with an electrical signal, and outputs the modulated light beam with the one wavelength, and the at most M light sources and a corresponding one of the multiplexers constitute a wavelength group generator.

21. The optical switch device according to claim 19, wherein the multiplexers are cyclic multiplexers, and the MN/L tunable filters are each configured to select a modulated light beam with any one wavelength among M different wavelengths for the whole set of N multiplexers, or the multiplexers are non-cyclic multiplexers, and the MN/L tunable filters are each configured to select a modulated light beam with any one wavelength among (M+(L−1)) different wavelengths for the whole set of N multiplexers.

22. The optical switch device according to claim 19, wherein the L different types of wavelengths in each of the wavelength groups include a start wavelength being one of M successively set wavelengths, and (L−1) wavelengths adjacent to the start wavelength.

23. The optical switch device according to claim 19, wherein the optical switch device functions as a wavelength routing switch in which MN modulation means of a plurality of light sources connected to the N multiplexers correspond to input ports of an optical circuit switching switch, and MN outputs of the tunable filters correspond to output ports of the optical circuit switching switch.

* * * * *